United States Patent
Kanbara et al.

(10) Patent No.: US 12,030,128 B2
(45) Date of Patent: Jul. 9, 2024

(54) CUTTING INSERT AND CUTTING EDGE REPLACEMENT TYPE CUTTING TOOL

(71) Applicant: MITSUBISHI MATERIALS CORPORATION, Tokyo (JP)

(72) Inventors: Masashi Kanbara, Tokyo (JP); Jun Kitajima, Tokyo (JP); Chinami Sakamoto, Tokyo (JP); Shota Watanabe, Tokyo (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 549 days.

(21) Appl. No.: 17/270,645

(22) PCT Filed: Aug. 27, 2019

(86) PCT No.: PCT/JP2019/033528
§ 371 (c)(1),
(2) Date: Feb. 23, 2021

(87) PCT Pub. No.: WO2020/045438
PCT Pub. Date: Mar. 5, 2020

(65) Prior Publication Data
US 2021/0339321 A1    Nov. 4, 2021

(30) Foreign Application Priority Data

Aug. 30, 2018 (JP) .................. 2018-161805
Aug. 30, 2018 (JP) .................. 2018-161806

(51) Int. Cl.
*B23C 5/20* (2006.01)

(52) U.S. Cl.
CPC ...... *B23C 5/202* (2013.01); *B23C 2200/0411* (2013.01); *B23C 2200/203* (2013.01); *B23C 2200/291* (2022.02); *B23C 2200/369* (2022.02)

(58) Field of Classification Search
CPC .............. B23C 5/202; B23C 2200/291; B23C 2200/287; B23C 2200/203;
(Continued)

(56) References Cited

U.S. PATENT DOCUMENTS 5,466,097 A * 11/1995 Wallstrom .............. B23C 5/202
407/113
8,708,616 B2 * 4/2014 Smilovici ................ B23C 5/06
407/42
(Continued)

FOREIGN PATENT DOCUMENTS

CN          101663121 A     3/2010
EP          2415544 A1      2/2012
(Continued)

OTHER PUBLICATIONS

Office Action dated Mar. 25, 2023, issued for Chinese Patent Application No. 201980052647.X and English translation of the Search Report.
(Continued)

*Primary Examiner* — Ryan Rufo
(74) *Attorney, Agent, or Firm* — Locke Lord LLP

(57) ABSTRACT

A cutting insert includes first and second polygonal surfaces and a plurality of side surfaces. A corner edge that has a corner rake surface on the first polygonal surface is formed at a first corner portion, and a main cutting edge is formed from the corner edge to a second corner portion. The main cutting edge includes, at least on a corner edge side, a rake angle gradual increase region where a rake angle of a main rake surface gradually increases to a positive angle side as going from a first end portion of the corner edge toward a second corner portion side.

13 Claims, 20 Drawing Sheets

(58) Field of Classification Search
CPC ....... B23C 2200/0411; B23C 2200/366; B23B 2200/3654; B23B 2200/286
See application file for complete search history.

(56) References Cited

U.S. PATENT DOCUMENTS

| | | | |
|---|---|---|---|
| 9,278,396 B2* | 3/2016 | Diepold | B23C 5/202 |
| 9,327,354 B2* | 5/2016 | Yamamichi | B23C 5/06 |
| 9,475,133 B2* | 10/2016 | Koga | B23B 27/143 |
| 10,232,445 B2* | 3/2019 | Ikeda | B23B 27/145 |
| 10,576,548 B2* | 3/2020 | Ikeda | B23B 27/145 |
| 2012/0070240 A1* | 3/2012 | Ishi | B23C 5/202 407/42 |
| 2012/0189396 A1 | 7/2012 | Xu | |
| 2020/0023444 A1* | 1/2020 | Saitoh | B23C 5/202 |
| 2020/0406376 A1* | 12/2020 | Jansson | B23C 5/202 |

FOREIGN PATENT DOCUMENTS

| | | |
|---|---|---|
| EP | 2727672 A1 | 5/2014 |
| JP | H10-100015 A | 4/1998 |
| JP | 5715688 B2 | 5/2015 |
| JP | 2016-144831 A | 8/2016 |
| JP | 2017-159440 A | 9/2017 |
| KR | 100661527 B1 * | 12/2006 |
| WO | 2008/120188 A2 | 10/2008 |
| WO | 2010/114094 A1 | 10/2010 |

OTHER PUBLICATIONS

Supplementary European Search Report dated May 10, 2022, issued for European Patent Application No. 19855701.9.
International Search Report dated Nov. 26, 2019, issued for PCT/JP2019/033528 and English translation thereof.

* cited by examiner

CUTTING INSERT AND CUTTING EDGE REPLACEMENT TYPE CUTTING TOOL

TECHNICAL FIELD

The present invention relates to a cutting insert, which is detachably attached to a cutting edge replacement type cutting tool, and the cutting edge replacement type cutting tool, in which the cutting insert is detachably attached on a tip portion outer periphery of a tool main body to be rotated about an axis.

Priority is claimed on Japanese Patent Application No. 2018-161805 and Japanese Patent Application No. 2018-161806, filed Aug. 30, 2018, the contents of which are incorporated herein by reference.

BACKGROUND ART

As such a cutting insert, for example, a cutting insert including an insert main body that has a substantially hexagonal plate shape having three main corners and three auxiliary corners alternately on upper and lower surfaces is described in Patent Literature 1. A corner edge, an auxiliary cutting edge that has a straight line shape inclined toward the lower surface as separating away from the corner edge, and a main cutting edge that is inclined toward the lower surface at an angle larger than the auxiliary cutting edge as separating away from the auxiliary cutting edge are formed in this order toward two auxiliary corners adjacent to a first main corner among three main corners of the upper surface. The parts extending toward the adjacent two auxiliary corners from the first main corner have the same shapes, and this is a so-called double-handed cutting insert. Patent Literature 1 also describes that a rake angle of the main cutting edge is constant. Patent Literature 1 also describes that the main cutting edge has a shape concave toward a lower surface side in side view and is inclined downward to gradually come close to the lower surface as going from an end portion of the auxiliary cutting edge toward an end portion on an auxiliary corner side.

Such a cutting insert is detachably attached to an insert attachment seat formed at a tip portion of a tool main body of a cutting edge replacement type cutting tool, which is rotated about an axis, such that the corner edge is positioned on a tip outer peripheral side of the tool main body, a set of the auxiliary cutting edge and the main cutting edge, which is connected to the corner edge, is positioned on an outer peripheral side of the tool main body, and another set of the auxiliary cutting edge and the main cutting edge is positioned on a tip side of the tool main body. In the cutting insert attached to the tool main body in this manner, the cutting of a relatively large depth of cut in a wall surface is performed by a set of the auxiliary cutting edge and the main cutting edge, which is positioned on the outer peripheral side of the tool main body, and finish cutting of a bottom surface is performed by the auxiliary cutting edge of another set of the auxiliary cutting edge and the main cutting edge, which is positioned on the tip side of the tool main body.

CITATION LIST

Patent Literature

[Patent Literature 1] Japanese Patent No. 5715688

SUMMARY OF INVENTION

Technical Problem

However, in the cutting of a relatively large depth of cut by such a cutting insert, a low cutting resistance is required so that chatter vibration does not occur in a work material such as a thin plate, obtaining finished surfaces (the wall surface and the bottom surface) having a good surface quality and high accuracy is required, and a good chip discharging property is required so that a chip to be generated is prevented from being caught in. In particular, when a good chip discharging property cannot be obtained by controlling a discharge direction of the chip, an increase in the cutting resistance is caused as the chip is caught in, and the caught chip damages the wall surface or the bottom surface of the work material. Consequently, the quality or accuracy of the finished surfaces is lost.

The present invention is devised under such circumstances, and an object thereof is to provide a cutting insert that can prevent a chip from being caught in to suppress an increase in a cutting resistance and secure a high quality or accuracy of a finished surface by controlling a discharge direction of a chip generated by a main cutting edge positioned on an outer peripheral side of a tool main body and a cutting edge replacement type cutting tool to which the cutting insert is detachably attached.

Solution to Problem

First Aspect of Present Invention

According to a first aspect of the present invention, in order to solve the problems, there is provided a cutting insert including a polygonal plate-shaped insert main body that includes first and second polygonal surfaces which face opposite sides to each other and a plurality of side surfaces which are disposed in a vicinity of the first and second polygonal surfaces. A corner edge that has a corner rake surface on the first polygonal surface is formed at a first corner portion among corner portions of the first polygonal surface of the insert main body. From the corner edge to a second corner portion adjacent to the first corner portion in a circumferential direction of the first polygonal surface, a main cutting edge that has, on the first polygonal surface, a main rake surface connected to the corner rake surface and extends from a first end portion of the corner edge is formed. The main cutting edge includes, at least on a corner edge side, a rake angle gradual increase region where a rake angle of the main rake surface gradually increases to a positive angle side as going from the first end portion of the corner edge toward a second corner portion side.

A cutting edge replacement type cutting tool of the first aspect of the present invention has a tool main body that is rotated about an axis and an insert attachment seat that is formed on a tip portion outer periphery of the tool main body. The cutting insert is detachably attached to the insert attachment seat such that the corner edge is positioned on a tip outer peripheral side of the tool main body, the main cutting edge extending from the first end portion of the corner edge is positioned on an outer peripheral side of the tool main body, and the corner rake surface and the main rake surface, which are connected to the corner edge and the main cutting edge, face a tool rotation direction.

In the cutting insert and the cutting edge replacement type cutting tool, the main cutting edge positioned on the outer peripheral side of the tool main body includes, on the corner edge side on the tool main body tip side, the rake angle gradual increase region where the rake angle of the main rake surface gradually increases to the positive angle side as going from the first end portion of the corner edge toward the second corner portion side positioned on a tool main body rear end side. Accordingly, since a chip generated by the main cutting edge from the corner edge side flows along the main rake surface having the larger rake angle on the rear end side of the main cutting edge than on the tip side and a space that is larger on a tool rotation direction side rather than on the tip side is secured on the rear end side, a curl having a larger radius on the rear end side of the main cutting edge than on the tip side is made.

Accordingly, the chip flows out in a direction separating away from the main cutting edge as a center line of the curl faces from a tip portion to a rear end portion, that is, a direction toward an inner peripheral side as going toward the rear end side of the tool main body, and the chip is discharged while imparting a curling tendency so that the chip is curled in the same direction. Therefore, since a discharge direction of the chip is controlled so as to be separated away from the wall surface cut by the main cutting edge, the chip can be prevented from being caught between the cut wall surface of the work material and the insert main body, it is possible to prevent that a finished surface (wall surface) is damaged as such a chip is caught in and the quality or accuracy of a finished surface is lost, and it is possible to suppress an increase in a cutting resistance.

The rake angle gradual increase region may be formed within a range of 1.0 mm to 2.0 mm from the first end portion of the corner edge in plan view facing the first polygonal surface. When the rake angle gradual increase region is formed within such a range, the chip is generated, with the curling tendency described above imparted, so that the discharge direction can be controlled. Therefore, for example, the rake angle of the main cutting edge may be constant within a range exceeding the first end portion of the corner edge by 2.0 mm. In a case where the rake angle gradual increase region is shorter than 1.0 mm from the first end portion of the corner edge, there is a possibility that the curling tendency cannot be sufficiently imparted to the chip.

It is desirable that a gradual increase amount of the rake angle in the rake angle gradual increase region is 5° or more. When the gradual increase amount of the rake angle in the rake angle gradual increase region is less than 5°, it is difficult to sufficiently impart a curling tendency, in which the discharge direction faces the direction toward the inner peripheral side as going toward the rear end side of the tool main body as described above, to the chip, and there is a possibility that it is impossible to reliably prevent the chip from being caught in.

It is desirable that a boundary line between the main rake surface and the corner rake surface, which extends from the first end portion of the corner edge toward an inner side of the first polygonal surface, intersects the main cutting edge at an intersection angle within a range of 20° to 60° in plan view facing the first polygonal surface. As the rake angle gradual increase region of the main rake surface is formed by intersecting the main rake surface and the corner rake surface each other at such an intersection angle, the chip is guided along the boundary line between the main rake surface and the corner rake surface and it is possible to more reliably control the discharge direction so as to be a direction separating away from the main cutting edge, that is, a direction toward the inner peripheral side as going toward the rear end side of the tool main body.

When the intersection angle of the boundary line with respect to the main cutting edge in the plan view is less than 20°, there is a possibility that the discharge direction of the chip cannot be controlled so as to be the direction toward the inner peripheral side as going toward the rear end side of the tool main body. On the contrary, when the intersection angle exceeds 60°, it is difficult for the chip to be discharged to the rear end side of the tool main body, the chip flowed out to the inner peripheral side of the tool main body abuts against the wall surface of a chip pocket of the tool main body and flows to the outer peripheral side. Thus, a possibility that the chip is caught between the main cutting edge and the cut wall surface of the work material arises.

By forming the corner edge to extend in a protruding direction separating away from the second polygonal surface as going toward the first end portion, the chip generated from the corner edge to a tip portion of the main cutting edge can be made likely to be discharged toward the inner peripheral side as going further toward the rear end side of the tool main body. In particular, in such a case, by forming the corner edge in a concave curve shape in side view facing a corner clearance surface, which intersects the corner rake surface via the corner edge, among the plurality of side surfaces of the insert main body, the tip portion of the chip generated by the corner edge can be reliably curled about the center line toward the inner peripheral side as going toward the rear end side of the tool main body as described above, and it is possible to more effectively prevent the chip from being caught in.

In a case where the corner edge is formed to extend in the protruding direction separating away from the second polygonal surface as going toward the first end portion as described above, it is desirable that the first end portion of the corner edge protrudes with respect to a second end portion of the corner edge on an opposite side to the first end portion by a protruding amount within a range of 0.05 mm to 0.15 mm in side view facing a corner clearance surface, which intersects the corner rake surface via the corner edge, among the plurality of side surfaces of the insert main body. When the protruding amount is less than 0.05 mm, there is a possibility that an effect of controlling the discharge direction of the chip so as to be the direction toward the inner peripheral side as going toward the rear end side of the tool main body as described above decreases. When the protruding amount exceeds 0.15 mm, the intersection angle between the corner edge and the main cutting edge at the first end portion is small, and there is a possibility that a defect is likely to occur.

In a case where the insert main body has an insert center line passing through centers of the first and second polygonal surfaces and an auxiliary cutting edge is formed on the first polygonal surface to extend from a second end portion of the corner edge on an opposite side to the first end portion of the corner edge, and the auxiliary cutting edge has an auxiliary rake surface connected to the corner rake surface on an opposite side to the main rake surface, by forming the auxiliary cutting edge along a plane perpendicular to the insert center line, or by forming the auxiliary cutting edge to extend toward a second polygonal surface side as going away from the second end portion of the corner edge, when viewed toward an auxiliary clearance surface that intersects the auxiliary rake surface via the auxiliary cutting edge, the curl radius of the tip portion of the chip is made smaller than the rear end portion also by the auxiliary cutting edge and it is possible to guide the chip in a direction of the center line described above.

In this case, it is desirable that an inclination angle of the auxiliary cutting edge with respect to the plane perpendicular to the insert center line in the side view facing the auxiliary clearance surface is within a range of 0° to 15°. When the inclination angle is less than 0° and the auxiliary cutting edge extends toward the opposite side to the second polygonal surface as separating away from the second end portion of the corner edge, the center line of the curl of the chip faces the outer peripheral side as going toward the rear end side of the tool main body, and thus there is a possibility that the chip cannot be reliably prevented from being caught in. When the inclination angle of the auxiliary cutting edge is large enough to exceed 15°, it is difficult to discharge the chip to the rear end side of the tool main body, and thus there is a possibility that the chip is caught in.

On the other hand, by forming, on the corner edge side, the main cutting edge so as to go away from the second polygonal surface while forming a convex curve and then extends toward a second polygonal surface side as going from the first end portion of the corner edge toward the second corner portion side in side view facing a main clearance surface, which intersects the main rake surface, among the plurality of side surfaces, the chip is generated so as to be thin by being stretched in a convex curve shape in a section along the convex curve formed by the main cutting edge. Thus, the chip can be made likely to be rolled up such that the curl radius of the tip portion of the chip is even smaller than the rear end portion. For this reason, the discharge direction can be controlled by more reliably curling the chip about the center line toward the inner peripheral side as going toward the rear end side of the tool main body.

In this case, it is desirable that in the side view facing the main clearance surface, a curvature radius of the convex curve formed by the main cutting edge is within a range of 3 mm to 10 mm, and the main cutting edge forms the convex curve at least within a range of 1.0 mm from the first end portion of the corner edge. When the curvature radius of the convex curve formed by the main cutting edge is less than 3 mm, there is a possibility that a defect is likely to occur in the main cutting edge at this portion. On the other hand, when the curvature radius exceeds 10 mm, the convex curve becomes flat. Thus, there is a possibility that an effect of controlling the discharge direction of the chip is lost. Even when the range of the convex curve formed by the main cutting edge is shorter than a range of 1.0 mm from the first end portion of the corner edge as described above, there is a possibility that the effect of controlling the discharge direction of the chip cannot be sufficiently achieved.

The insert main body may be formed in a hexagonal plate shape that is a rotationally symmetric shape by every 120° about an insert center line passing through centers of the first and second polygonal surfaces and is a front-back inverted symmetric shape with respect to the first and second polygonal surfaces. On the first and second polygonal surfaces, three first corner portions and three second corner portions may be alternately disposed in a circumferential direction, and may be disposed on opposite sides to each other in an insert center line direction. Further, between the first and second polygonal surfaces, the first end portion of the corner edge and a second end portion of the corner edge, which is on an opposite side to the first end portion, may be disposed on opposite sides to each other in a circumferential direction of the insert main body. In this case, one insert main body allows the use of the corner edge, the main cutting edge, or the auxiliary cutting edge three times for each of the first and second polygonal surfaces (hexagonal surfaces) on the front and back, in total six times.

Further, in this case, when the cutting insert is a negative type cutting insert in which the side surface of the insert main body is formed to extend parallel to the insert center line, the strength of the cutting edge can be improved by securing an edge angle of the corner edge, the main cutting edge, or the auxiliary cutting edge.

Second Aspect of Present Invention

According to a second aspect of the present invention, there is provided a cutting insert including a polygonal plate-shaped insert main body that includes first and second polygonal surfaces which face opposite sides to each other and a plurality of side surfaces which are disposed in a vicinity of the first and second polygonal surfaces. A corner edge that has a corner rake surface on the first polygonal surface is formed at a first corner portion among corner portions of the first polygonal surface of the insert main body. From the corner edge to a second corner portion adjacent to the first corner portion in a circumferential direction of the first polygonal surface, a main cutting edge that has, on the first polygonal surface, a main rake surface connected to the corner rake surface and extends from a first end portion of the corner edge is formed. On the corner edge side, the main cutting edge goes away from the second polygonal surface while forming a convex curve and then extends toward a second polygonal surface side as going from the first end portion of the corner edge toward a second corner portion side in side view facing a main clearance surface, which intersects the main rake surface, among the plurality of side surfaces.

A cutting edge replacement type cutting tool of the second aspect of the present invention has a tool main body that is rotated about an axis and an insert attachment seat that is formed on a tip portion outer periphery of the tool main body. The cutting insert of the second aspect is detachably attached such that the corner edge is positioned on a tip outer peripheral side of the tool main body, the main cutting edge extending from the first end portion of the corner edge is positioned on an outer peripheral side of the tool main body, and the corner rake surface and the main rake surface, which are connected to the corner edge and the main cutting edge, face a tool rotation direction.

In the cutting insert and the cutting edge replacement type cutting tool of the second aspect, on the corner edge side, the main cutting edge is formed so as to go away from the second polygonal surface while forming a convex curve and then extends toward the second polygonal surface side as going from the first end portion of the corner edge toward the second corner portion side in side view facing a main clearance surface, which intersects the main rake surface, among the plurality of side surfaces. Therefore, since the tip portion of the chip on the corner edge side is generated so as to be thin by being stretched in a convex curve shape in a section along the convex curve formed by the main cutting edge, the chip can be made likely to be rolled up such that the curl radius of the tip portion of the chip is smaller than the rear end portion.

For this reason, the chip flows out in a direction separating away from the main cutting edge as going from the tip portion toward the rear end portion, that is, the direction toward the inner peripheral side as going toward the rear end side of the tool main body, and the chip is discharged while imparting a curling tendency so that the chip is curled in the same direction. Therefore, since the discharge direction of the chip is controlled so as to be separated away from the wall surface cut by the main cutting edge, the chip can be prevented from being caught between the cut wall surface of the work material and the insert main body, it is possible to prevent that a finished surface (wall surface) is damaged as such a chip is caught in and the quality or accuracy of a finished surface is lost, and it is also possible to suppress an increase in a cutting resistance.

It is desirable that in the side view facing the main clearance surface, a curvature radius of the convex curve formed by the main cutting edge is within a range of 3 mm to 10 mm, and the main cutting edge forms the convex curve at least within a range of 1.0 mm from the first end portion of the corner edge. When the curvature radius of the convex curve formed by the main cutting edge is less than 3 mm, there is a possibility that a defect is likely to occur in the main cutting edge at this portion. On the other hand, when the curvature radius exceeds 10 mm, the convex curve becomes flat. Thus, there is a possibility that an effect of controlling the discharge direction of the chip is lost. Even when the range of the convex curve formed by the main cutting edge is shorter than a range of 1.0 mm from the first end portion of the corner edge as described above, there is a possibility that the effect of controlling the discharge direction of the chip cannot be sufficiently achieved.

It is desirable that a boundary line between the main rake surface and the corner rake surface, which extends from the first end portion of the corner edge toward an inner side of the first polygonal surface, intersects the main cutting edge at an intersection angle within a range of 20° to 60° in plan view facing the first polygonal surface. As the rake angle gradual increase region of the main rake surface is formed by intersecting the main rake surface and the corner rake surface each other at such an intersection angle, the chip is guided along the boundary line between the main rake surface and the corner rake surface and it is possible to more reliably control the discharge direction so as to be a direction separating away from the main cutting edge, that is, a direction toward the inner peripheral side as going toward the rear end side of the tool main body.

When the intersection angle of the boundary line with respect to the main cutting edge in the plan view is less than 20°, there is a possibility that the discharge direction of the chip cannot be controlled so as to be the direction toward the inner peripheral side as going toward the rear end side of the tool main body. On the contrary, when the intersection angle exceeds 60°, it is difficult for the chip to be discharged to the rear end side of the tool main body, the chip flowed out to the inner peripheral side of the tool main body abuts against the wall surface of the chip pocket of the tool main body and flows to the outer peripheral side. Thus, a possibility that the chip is caught between the main cutting edge and the cut wall surface of the work material arises.

The corner edge may be formed to extend in a protruding direction separating away from the second polygonal surface as going toward the first end portion. In this case, the chip generated from the corner edge to the tip portion of the main cutting edge can be made likely to be discharged toward the inner peripheral side as going further toward the rear end side of the tool main body. In particular, in such a case, by forming the corner edge in a concave curve shape in side view facing a corner clearance surface, which intersects the corner rake surface via the corner edge, among the plurality of side surfaces of the insert main body, the tip portion of the chip generated by the corner edge can be reliably curled about the center line toward the inner peripheral side as going toward the rear end side of the tool main body as described above, and it is possible to more effectively prevent the chip from being caught in.

In a case where the corner edge is formed to extend in the protruding direction separating away from the second polygonal surface as going toward the first end portion as described above, it is desirable that the first end portion of the corner edge protrudes with respect to a second end portion of the corner edge on an opposite side to the first end portion by a protruding amount within a range of 0.05 mm to 0.15 mm in side view facing a corner clearance surface, which intersects the corner rake surface via the corner edge, among the plurality of side surfaces of the insert main body. When the protruding amount is less than 0.05 mm, there is a possibility that an effect of controlling the discharge direction of the chip so as to be a direction toward the inner peripheral side as going toward the rear end side of the tool main body as described above decreases. On the other hand, when the protruding amount exceeds 0.15 mm, there is a possibility that the intersection angle between the corner edge and the main cutting edge at the first end portion decreases and a defect is likely to occur.

The insert main body may have an insert center line passing through centers of the first and second polygonal surfaces. An auxiliary cutting edge may be formed on the first polygonal surface to extend from a second end portion of the corner edge on an opposite side to the first end portion of the corner edge, and the auxiliary cutting edge may have an auxiliary rake surface connected to the corner rake surface on an opposite side to the main rake surface. In this case, the auxiliary cutting edge may extend along a plane perpendicular to the insert center line, or extend toward a second polygonal surface side as going away from the second end portion of the corner edge, when viewed toward an auxiliary clearance surface that intersects the auxiliary rake surface via the auxiliary cutting edge. In this case, the curl radius of the tip portion of the chip is made smaller than the rear end portion also by the auxiliary cutting edge, and thus it is possible to guide the chip in the direction of the center line described above.

In this case, it is desirable that an inclination angle of the auxiliary cutting edge with respect to the plane perpendicular to the insert center line in the side view facing the auxiliary clearance surface is within a range of 0° to 15°. When the inclination angle is less than 0° and the auxiliary cutting edge extends toward the opposite side to the second polygonal surface as separating away from the second end portion of the corner edge, the center line of the curl of the chip faces the outer peripheral side as going toward the rear end side of the tool main body, and thus there is a possibility that the chip cannot be reliably prevented from being caught in. When the inclination angle of the auxiliary cutting edge is large enough to exceed 15°, it is difficult to discharge the chip to the rear end side of the tool main body, and thus there is a possibility that the chip is caught in.

Further, the insert main body may be formed in a hexagonal plate shape that is a rotationally symmetric shape by every 120° about an insert center line passing through centers of the first and second polygonal surfaces and is a front-back inverted symmetric shape with respect to the first and second polygonal surfaces. On the first and second polygonal surfaces, three first corner portions and three second corner portions may be alternately disposed in a circumferential direction, and may be disposed on opposite sides to each other in an insert center line direction. Further, between the first and second polygonal surfaces, the first end portion of the corner edge and a second end portion of the corner edge, which is on an opposite side to the first end portion, may be disposed on opposite sides to each other in a circumferential direction of the insert main body. In this case, one insert main body allows the use of the corner edge, the main cutting edge, or the auxiliary cutting edge three times for each of the first and second polygonal surfaces (hexagonal surfaces) on the front and back, in total six times.

Further, in this case, the side surface of the insert main body may be formed to extend parallel to the insert center line, thereby forming a negative type cutting insert. In this case, the strength of the cutting edge can be improved by securing the edge angle of the corner edge, the main cutting edge, or the auxiliary cutting edge.

Advantageous Effects of Invention

As described hereinbefore, with the present invention, by making the curl radius of the tip portion of the chip on the corner edge side smaller than the rear end portion and curling the chip about the curl center line toward the inner peripheral side as going toward the rear end side of the tool main body, the discharge direction of the chip can be controlled so as to be the direction separating away from the wall surface of the work material formed by the main cutting edge. Accordingly, the chip can be prevented from being caught between the wall surface and the main cutting edge, the quality or accuracy of the finished surface can be improved, and it is possible to suppress an increase in a cutting resistance.

DESCRIPTION OF EMBODIMENTS

Figure 21:
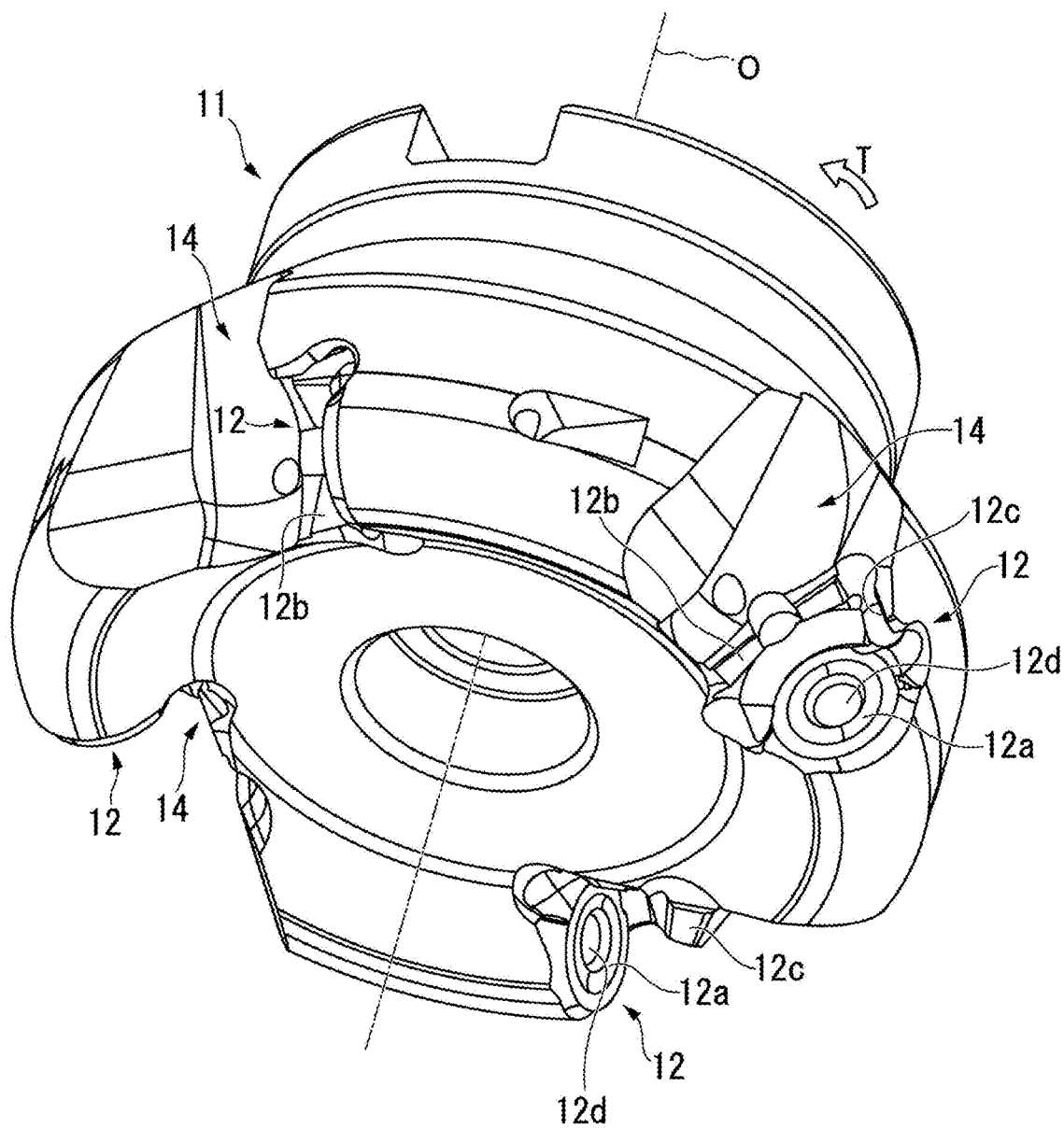
FIG. 21 is a perspective view of a tool main body according to an embodiment of a cutting edge replacement type cutting tool of the present invention.
Figure 22:
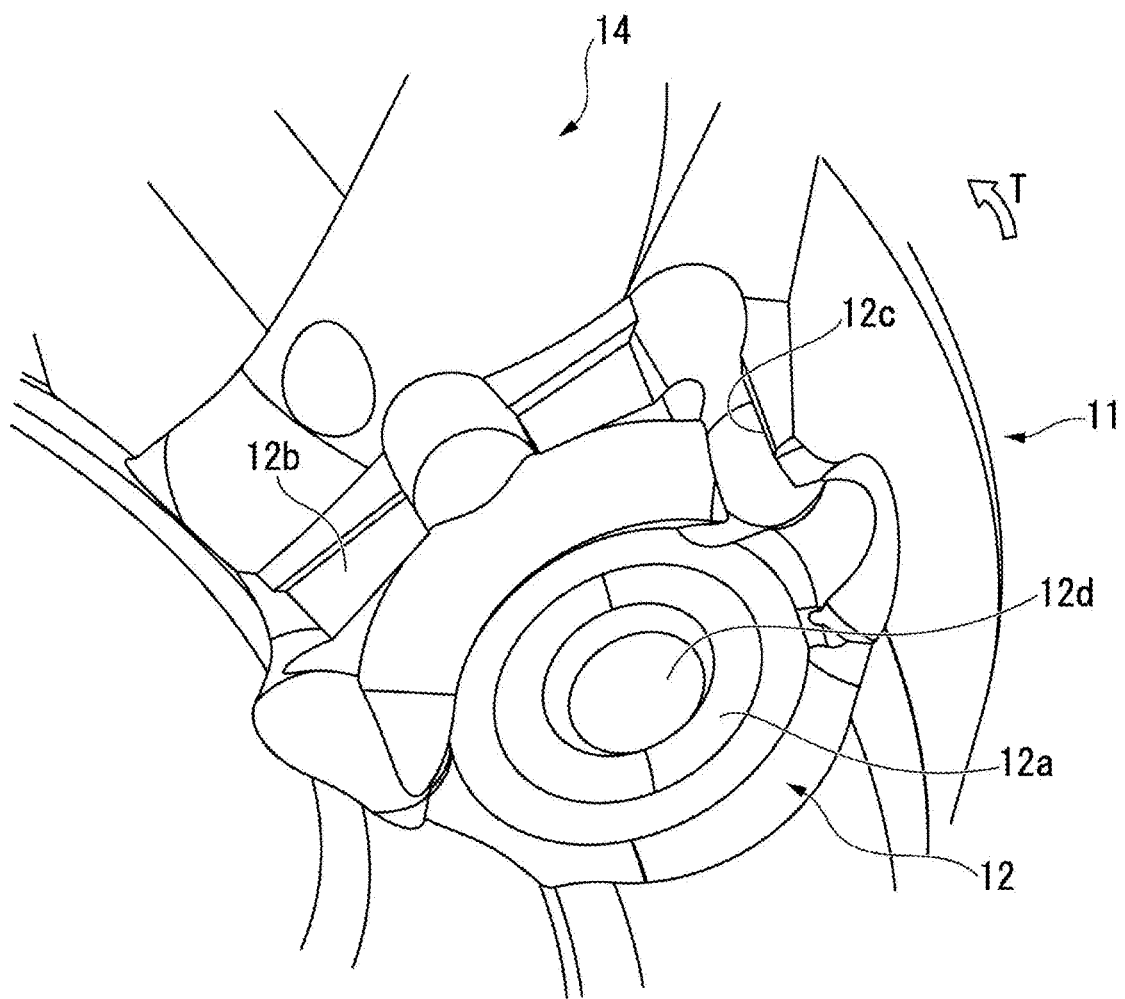
FIG. 22 is an enlarged perspective view around an insert attachment seat of the tool main body illustrated in FIG. 21.
Figure 28:
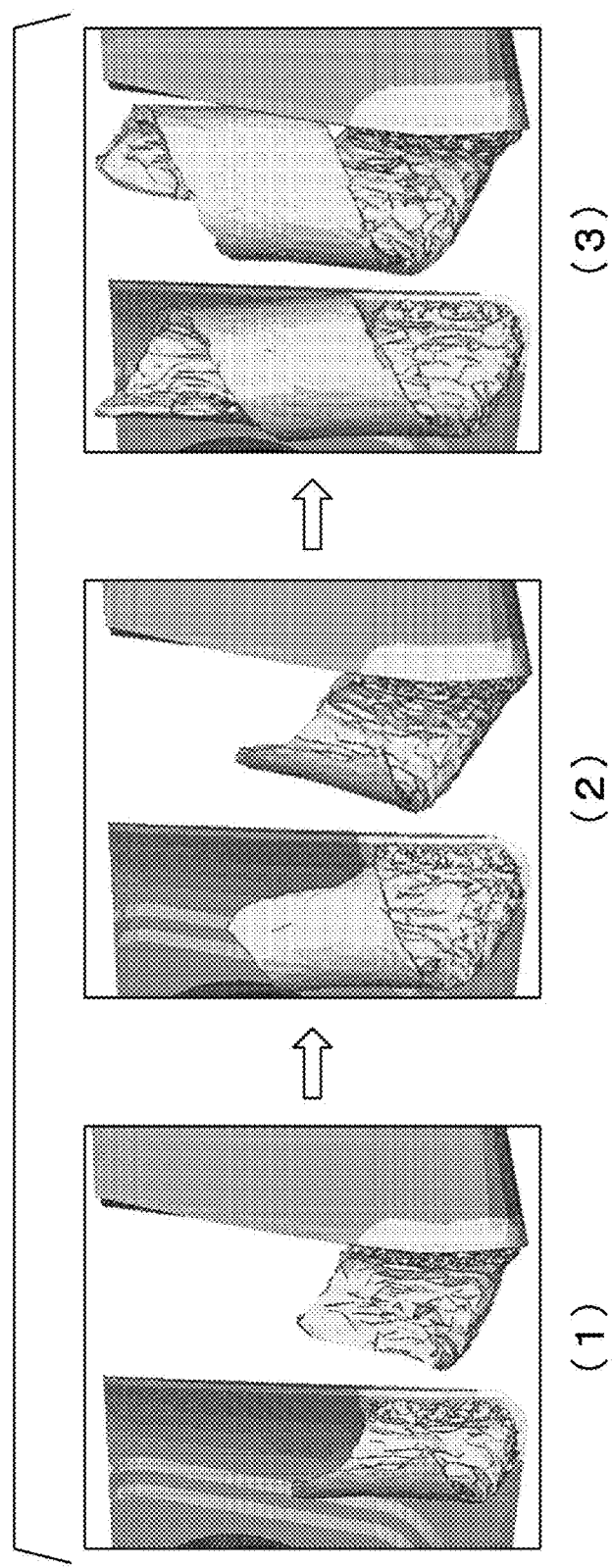
FIG. 28 illustrates a state where a chip is generated by the cutting insert of the embodiment illustrated in FIG. 1.
Figure 29:
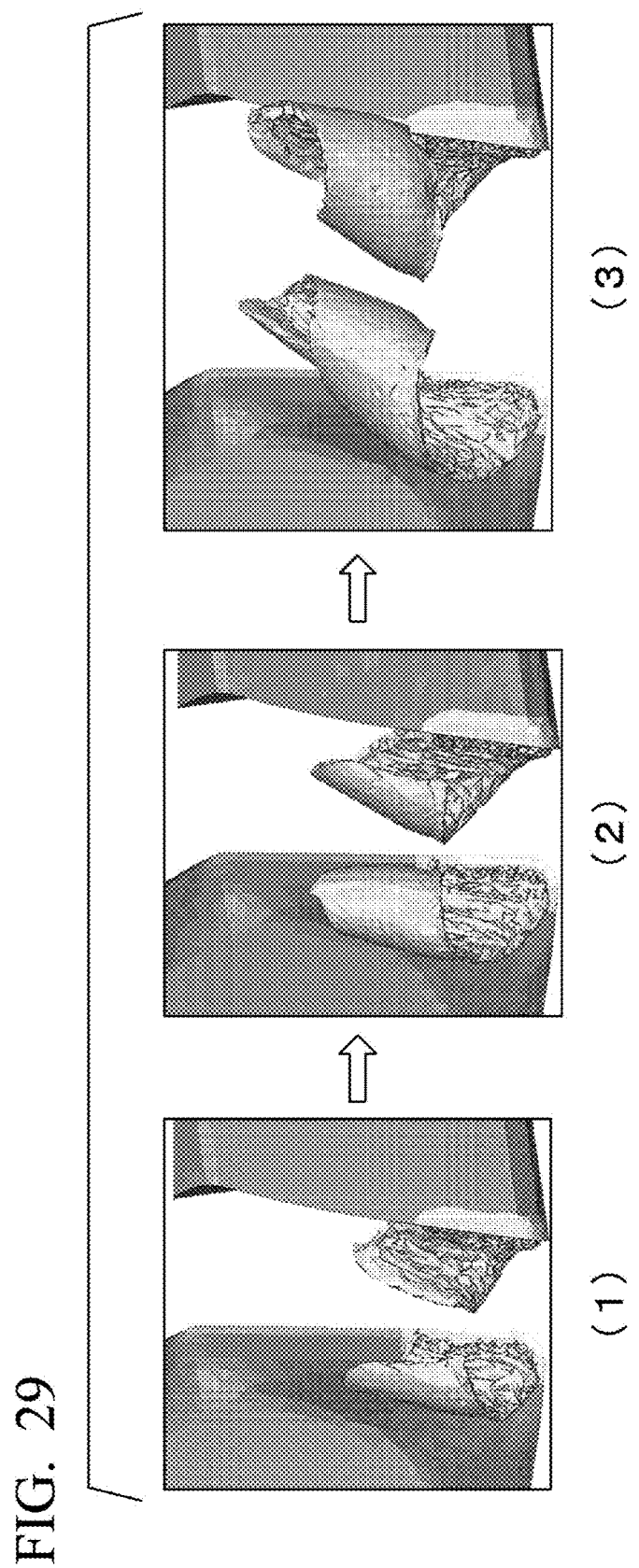
FIG. 29 illustrates a state where the chip is generated by the cutting insert in which a rake angle of a main cutting edge is constant.

FIGS. 1 to 20 illustrate an embodiment of a cutting insert of the present invention. FIGS. 21 and 22 illustrate a tool main body of a cutting edge replacement type cutting tool to which the cutting insert of the embodiment is attached. FIGS. 23 to 27 illustrate an embodiment of the cutting edge replacement type cutting tool of the present invention, in which the cutting insert of the embodiment of the present invention is attached to the tool main body. FIG. 28 illustrates states (1) to (3) in which a chip is generated by the cutting insert of the embodiment. FIG. 29 illustrates states (1) to (3) in which a chip is generated by a cutting insert having a constant rake angle of a main cutting edge as described in Patent Literature 1.

An insert main body 1 of the cutting insert of the present embodiment includes two hexagonal surfaces (first and second polygonal surfaces) 2 that are formed of a hard material, such as cemented carbide, in a polygonal plate shape, in particular, a hexagonal plate shape and face opposite sides to each other and a plurality of (six) side surfaces 3 that are disposed in the vicinity of the hexagonal surfaces 2. At centers of the two hexagonal surfaces 2, an attachment hole 4, which penetrates the insert main body 1 and has a circular section, is opened.

The insert main body 1 has a rotationally symmetric shape by every 120° about an insert center line C passing through a center of the attachment hole 4, and has a front-back inverted symmetric shape with respect to the two hexagonal surfaces 2. There is an annular flat portion 2a perpendicular to the insert center line C around an opening portion of the attachment hole 4 in each of the two hexagonal surfaces 2. The length of each side of the hexagonal surface 2 when viewed from an insert center line C direction is substantially equal.

Six corner portions of each of the two hexagonal surfaces 2 are first corner portions C1 and second corner portions C2 that alternate in a circumferential direction of the hexagonal surface 2. An angle between two ridge portions of the hexagonal surface 2 intersecting each other at the first corner portion C1 is smaller than an angle between two ridge portions of the hexagonal surface 2 intersecting each other at the second corner portion C2. Therefore, the angle is smaller than 120°, and is set to substantially 90°.

Among the two hexagonal surfaces 2, on an opposite side of the first corner portion C1 of one hexagonal surface 2 in the insert center line C direction, the first corner portion C1 of the other hexagonal surface 2 is positioned, and on an opposite side of the second corner portion C2 of one hexagonal surface 2 in the insert center line C direction, the second corner portion C2 of the other hexagonal surface 2 is positioned. The plurality of side surfaces 3 of the insert main body 1 each have a flat surface shape parallel to the insert center line C, and the cutting insert of the present embodiment is a negative type cutting insert.

A corner edge 5 having a corner rake surface 5a is formed at the first corner portion C1 of each of the hexagonal surfaces 2. The corner edge 5 is formed in a convex curve shape, such as a convex arc, in plan view facing the hexagonal surface 2 viewed from the insert center line C direction. Therefore, an intersecting ridge line portion between two side surfaces 3 intersecting the corner rake surface 5a via the corner edge 5, among the side surfaces 3 of the insert main body 1, is formed in a convex curved surface shape, such as a cylindrical surface parallel to the insert center line C, and is set as a corner clearance surface 5b.

The corner rake surface 5a, a main rake surface 6a, and an auxiliary rake surface 7a, which are to be described next, are inclined toward an opposite hexagonal surface 2 side to the hexagonal surface 2 with respect to a plane perpendicular to the insert center line C, as going toward an inner side of the hexagonal surface 2 on which the corner rake surface 5a, the main rake surface 6a, and the auxiliary rake surface 7a are formed.

Figure 1:
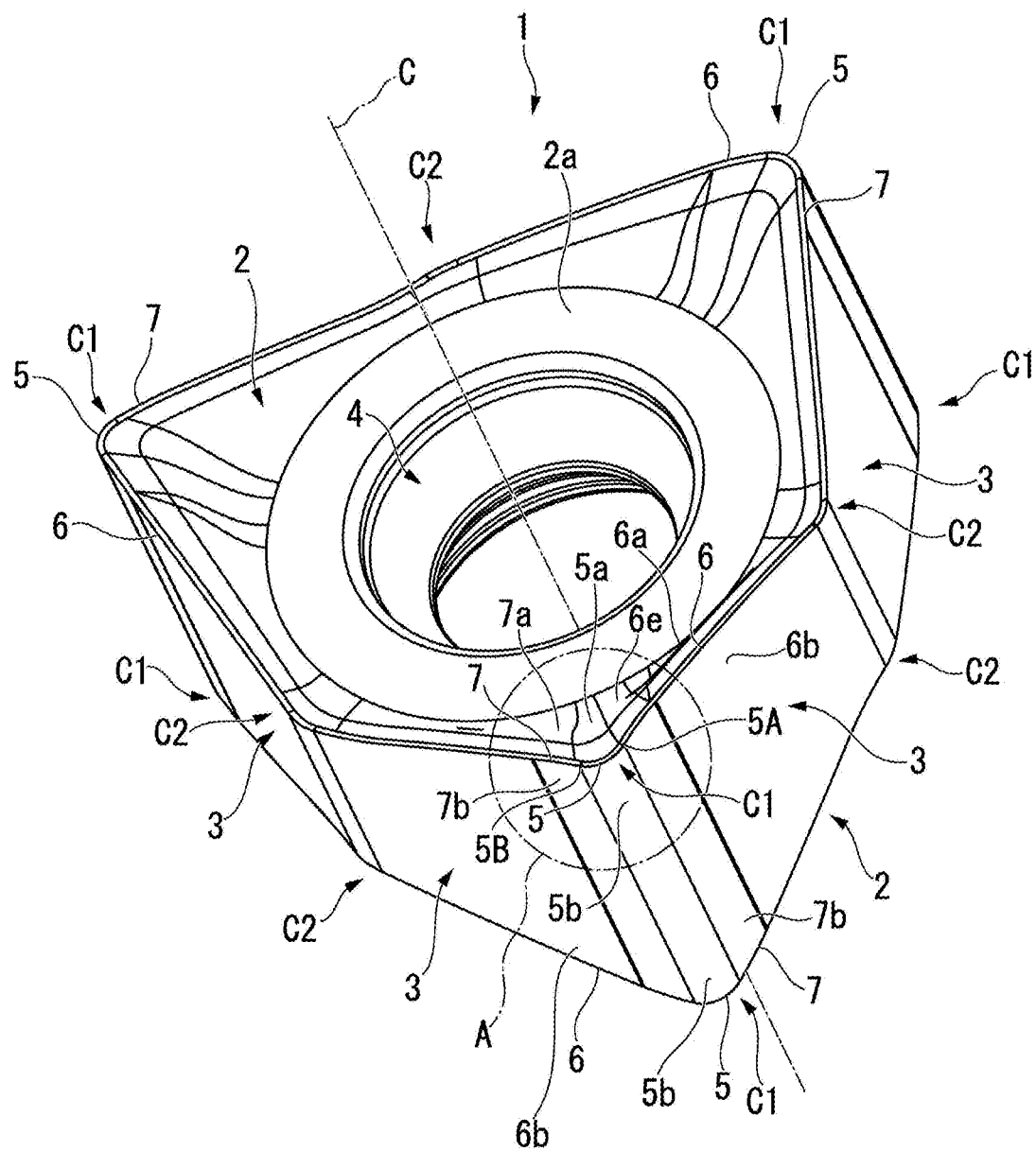
FIG. 1 is a perspective view illustrating an embodiment of a cutting insert of the present invention.
Figure 2:
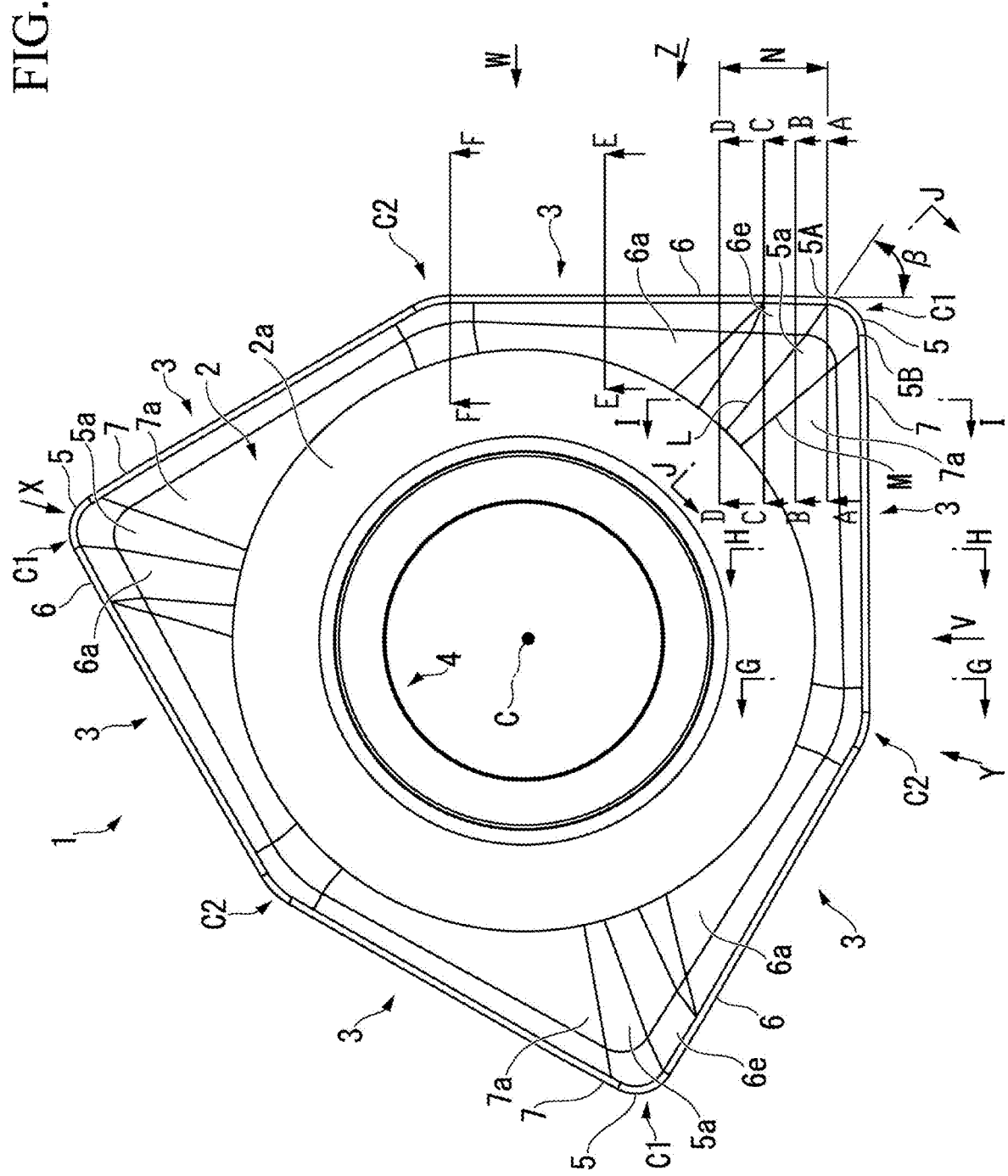
FIG. 2 is a plan view seen from a direction facing a polygonal surface (hexagonal surface) of the embodiment illustrated in FIG. 1.

From a first end portion (counterclockwise end portion of the corner edge 5 centered on the insert center line C in FIG. 2) 5A, which is one end portion of the corner edge 5, to the second corner portion C2 adjacent to a first end portion 5A side in the circumferential direction of the hexagonal surface 2, a main cutting edge 6 having, on each of the hexagonal surfaces 2, the main rake surface 6a connected to the corner rake surface 5a is formed. Since the plurality of side surfaces 3 of the insert main body 1 each have a flat surface shape, the main cutting edge 6 is formed in a straight line shape in the plan view facing the hexagonal surface 2 viewed from the insert center line C direction. Among the plurality of side surfaces 3, the side surface 3 intersecting the main rake surface 6a via the main cutting edge 6 is a main clearance surface 6b of the main cutting edge 6.

From a second end portion (clockwise end portion of the corner edge 5 centered on the insert center line C in FIG. 2) 5B, which is the other end portion of the corner edge 5 on the opposite side to the first end portion 5A, to the second corner portion C2 adjacent to the second end portion 5B in the circumferential direction of the hexagonal surface 2, an auxiliary cutting edge 7 having, on each of the hexagonal surfaces 2, the auxiliary rake surface 7a connected to the corner rake surface 5a is formed. Similar to the main cutting edge 6, the auxiliary cutting edge 7 is also formed in a straight line shape in the plan view facing the hexagonal surface 2 viewed from the insert center line C direction. Among the plurality of side surfaces 3 of the insert main body 1, the side surface 3 intersecting the auxiliary rake surface 7a via the auxiliary cutting edge 7 is an auxiliary clearance surface 7b of the auxiliary cutting edge 7.

On the two hexagonal surfaces 2 in the cutting insert of the present embodiment, in which the insert main body 1 has a front-back inverted symmetric shape with respect to the two hexagonal surfaces 2, the main cutting edge 6 and the auxiliary cutting edge 7 extend from the corner edge 5 in opposite directions in a circumferential direction of the insert main body 1. The main cutting edge 6 is formed at an intersecting ridge line portion between one hexagonal surface 2 and one side surface 3 of the insert main body 1 and is set as the main clearance surface 6b of the main cutting edge 6, and the auxiliary cutting edge 7 is formed at an intersecting ridge line portion between the other hexagonal surface 2 and the one side surface 3 and is set as the auxiliary clearance surface 7b of the auxiliary cutting edge 7.

As going toward the first end portion 5A from the second end portion 5B, the corner edge 5 extends in a protruding direction separating away from the hexagonal surface 2 opposite to the hexagonal surface 2, on which the corner edge is formed. In a case where the corner edge 5 is formed on a first polygonal surface (one hexagonal surface 2), the corner edge 5 extends in the protruding direction separating away from a second polygonal surface (the other hexagonal surface 2) as going from the second end portion 5B toward the first end portion 5A.

Figure 5:
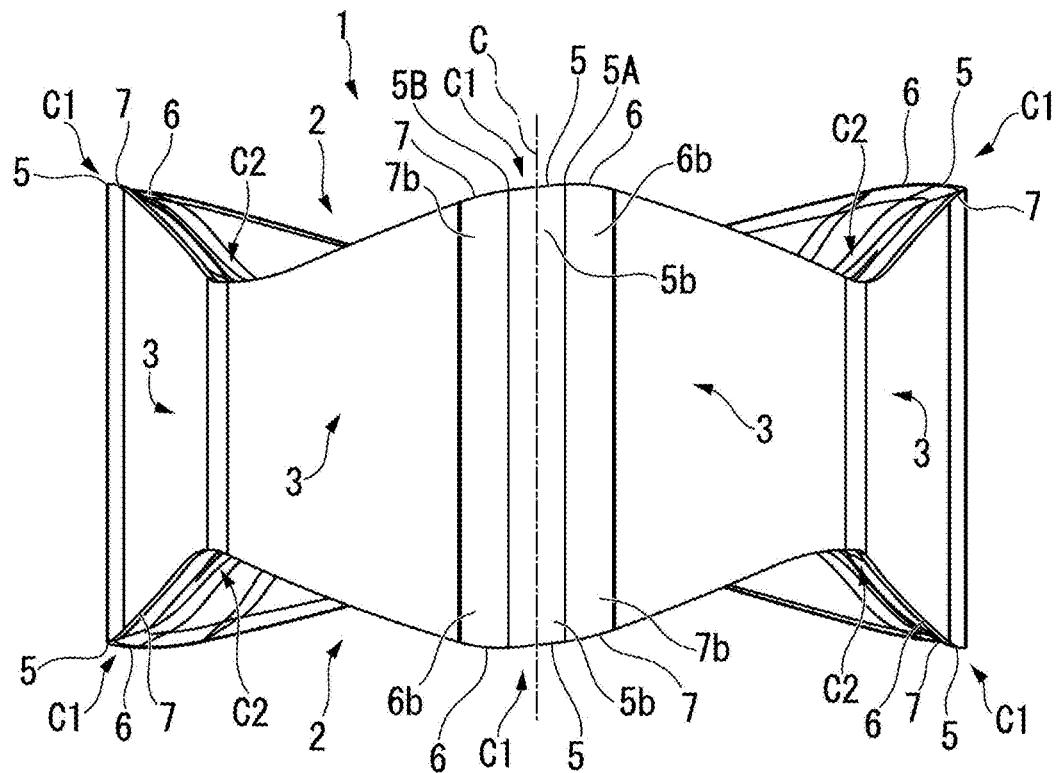
FIG. 5 is a side view seen from an arrow X direction in FIG. 2.
Figure 6:
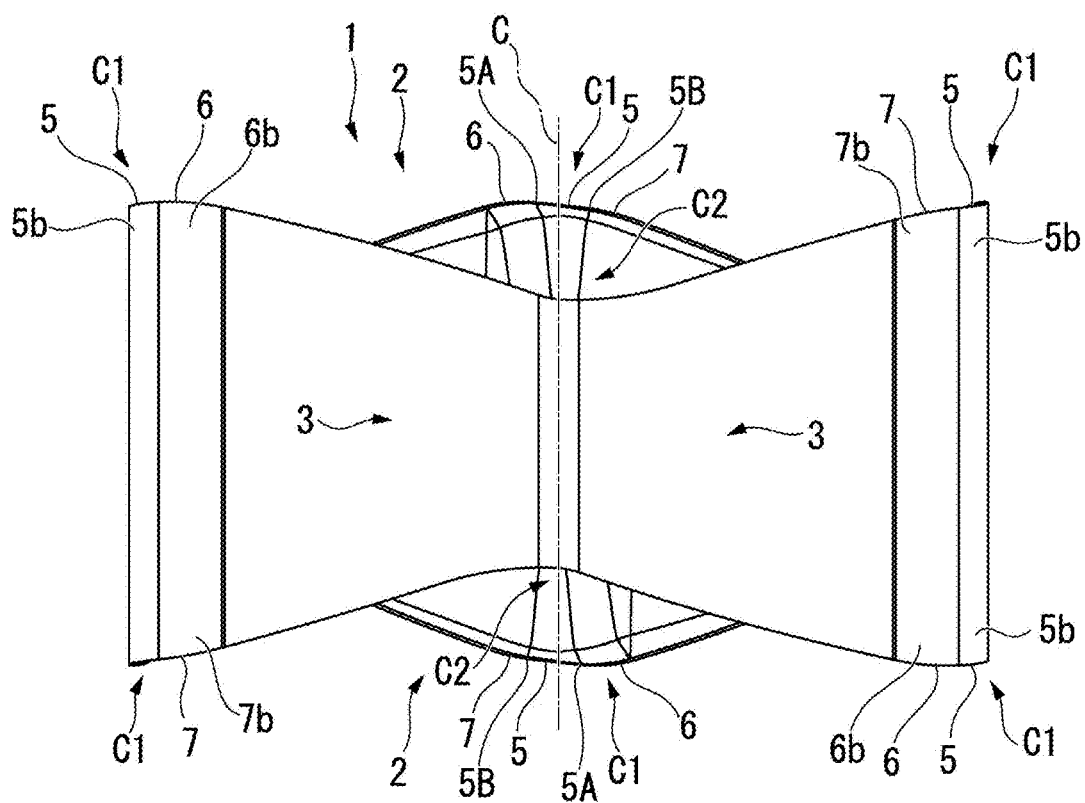
FIG. 6 is a side view seen from an arrow Y direction in FIG. 2.
Figure 7:
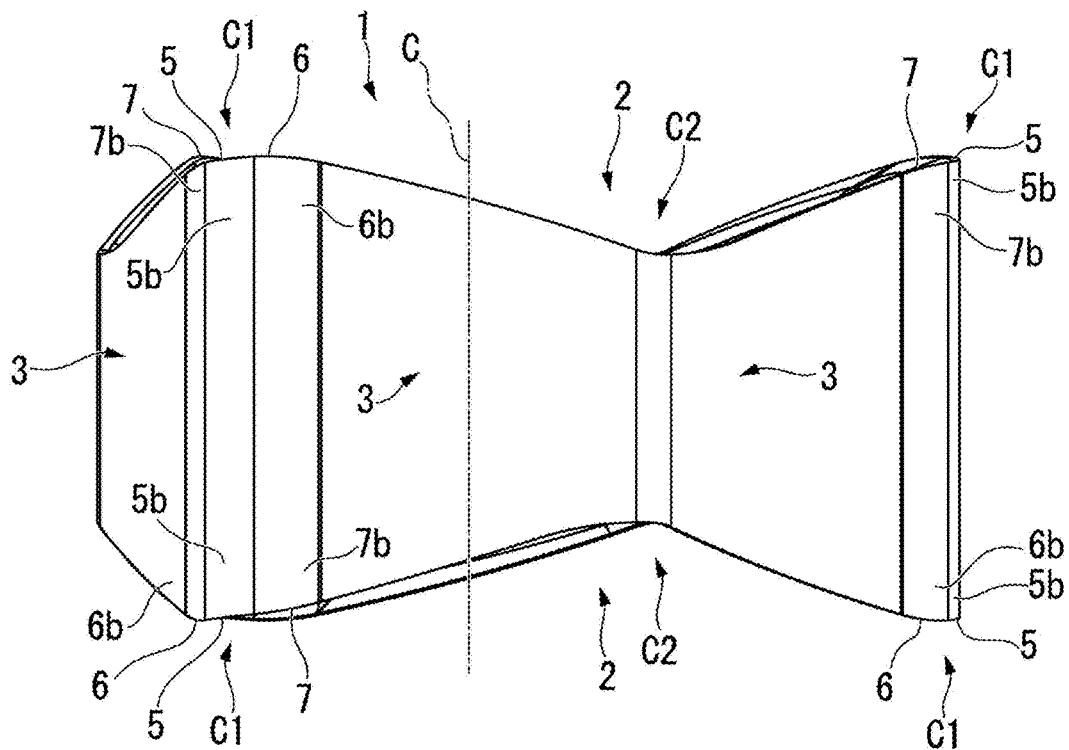
FIG. 7 is a side view seen from an arrow Z direction in FIG. 2.
Figure 8:
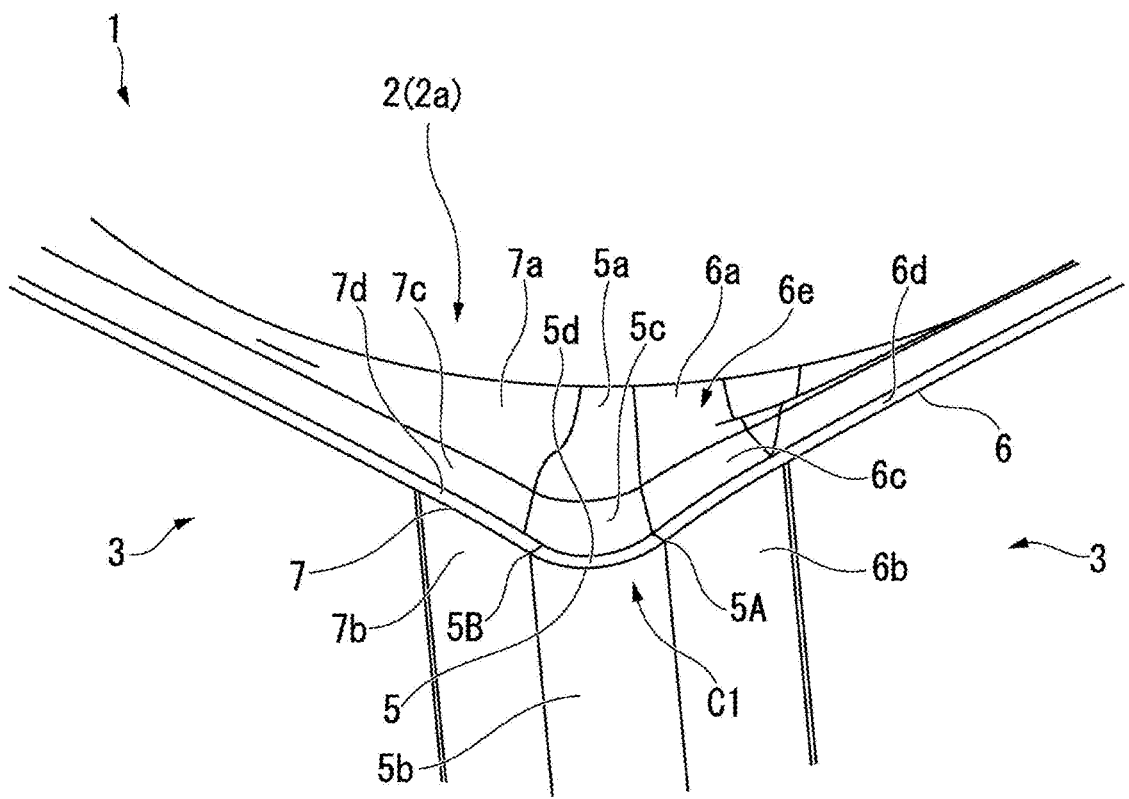
FIG. 8 is an enlarged view of a portion A in FIG. 1.

With respect to the second end portion 5B of the corner edge 5, which is opposite to the first end portion 5A, the first end portion 5A of the corner edge 5 protrudes in the insert center line C direction by a protruding amount t within a range of 0.05 mm to 0.15 mm as illustrated in FIG. 5, in side view facing the corner clearance surface 5b intersecting the corner rake surface 5a via the corner edge 5 among the plurality of side surfaces 3 of the insert main body 1 along the plane perpendicular to the insert center line C. The corner edge 5 is formed in a concave curve shape as illustrated in FIG. 5 or 8, in the side view facing the corner clearance surface 5b.

Figure 9:
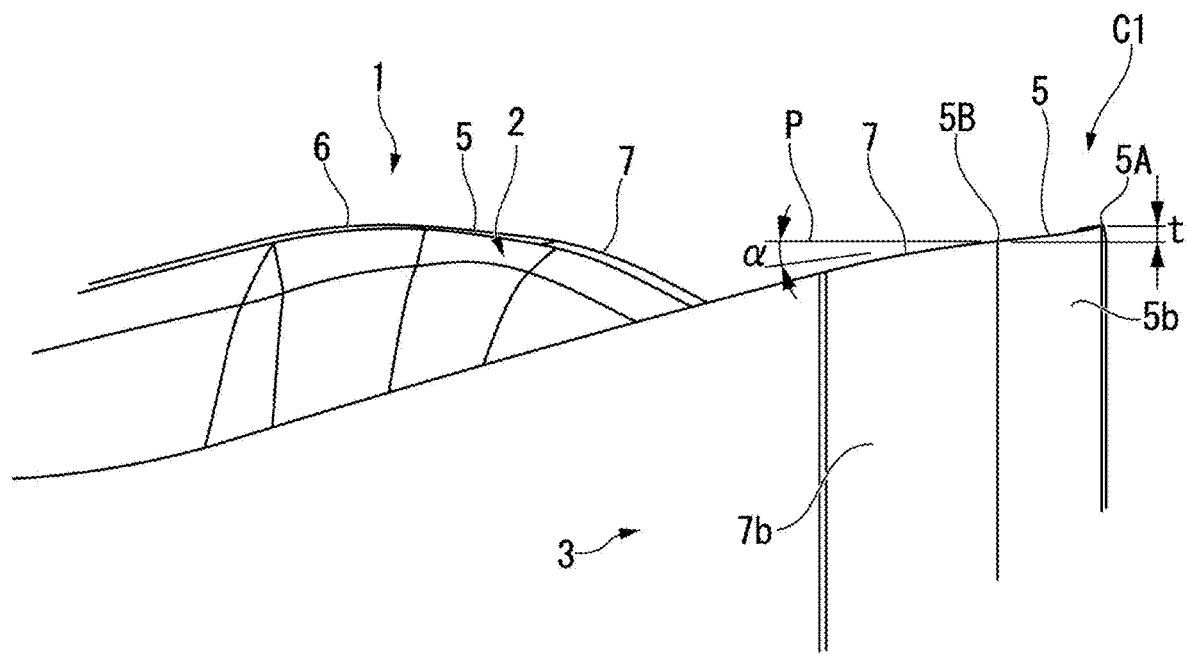
FIG. 9 is an enlarged view of a portion A in FIG. 3.
Figure 10:
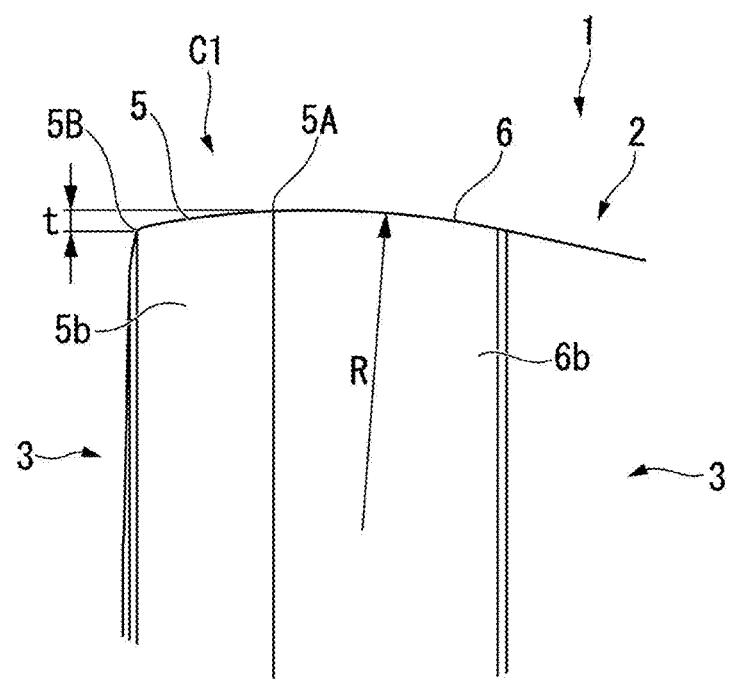
FIG. 10 is an enlarged view of a portion A in FIG. 4.
Figure 11:
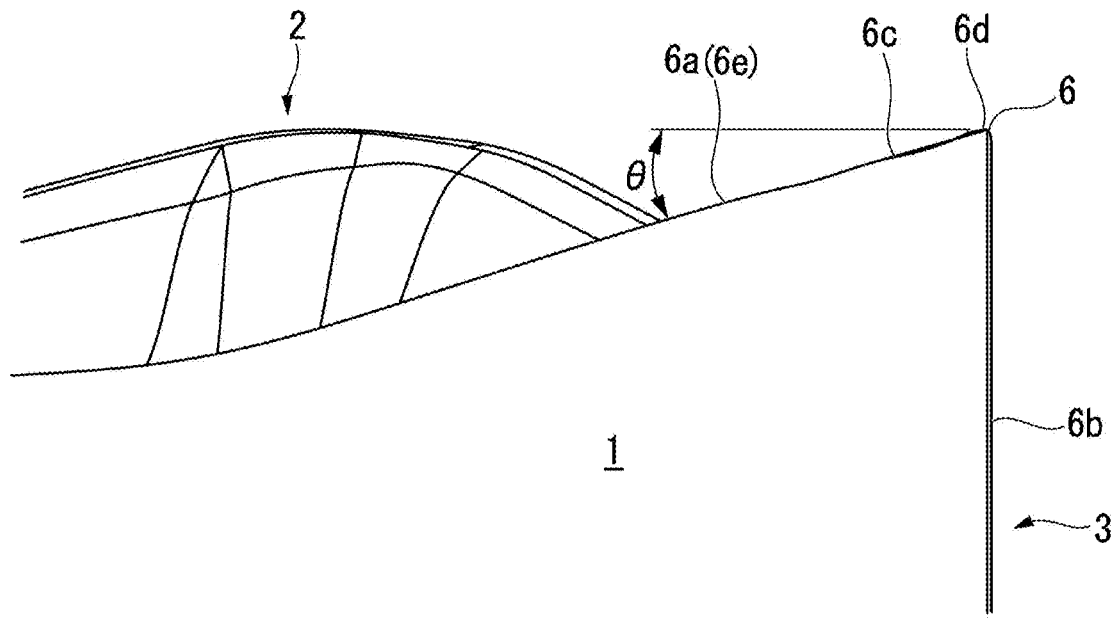
FIG. 11 is a sectional view taken along line AA in FIG. 2.
Figure 12:
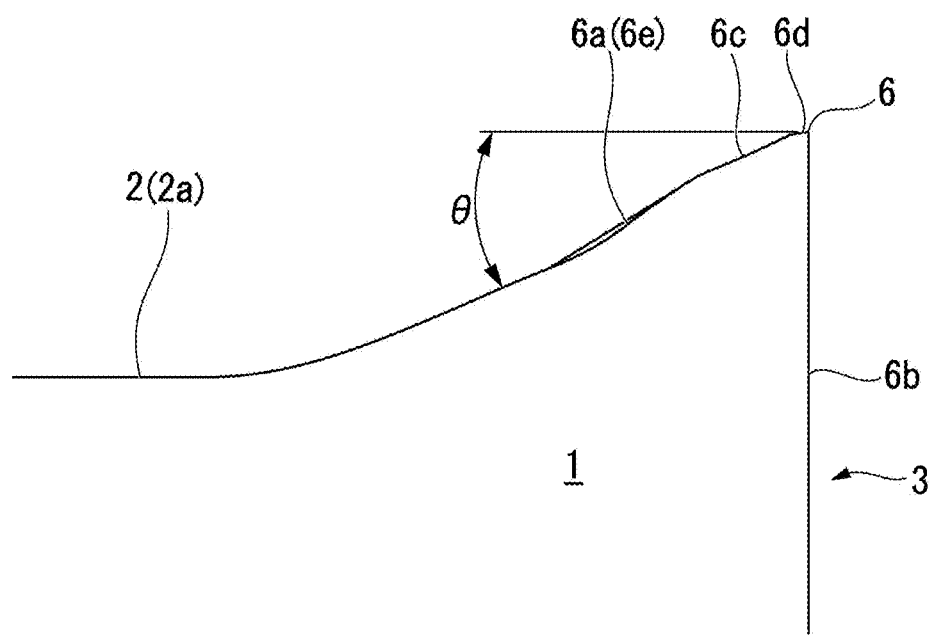
FIG. 12 is a sectional view taken along line BB in FIG. 2.
Figure 13:
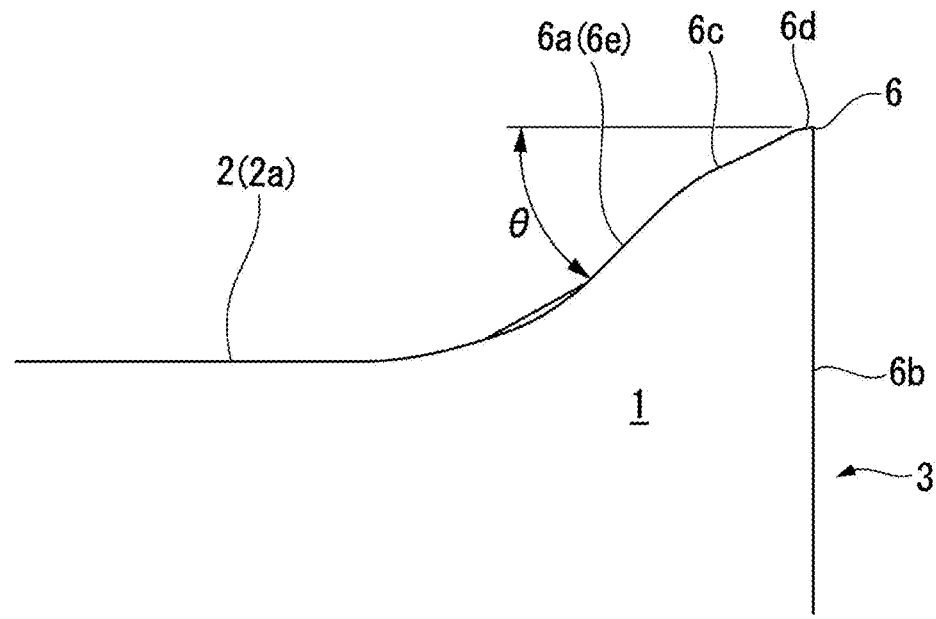
FIG. 13 is a sectional view taken along line CC in FIG. 2.
Figure 14:
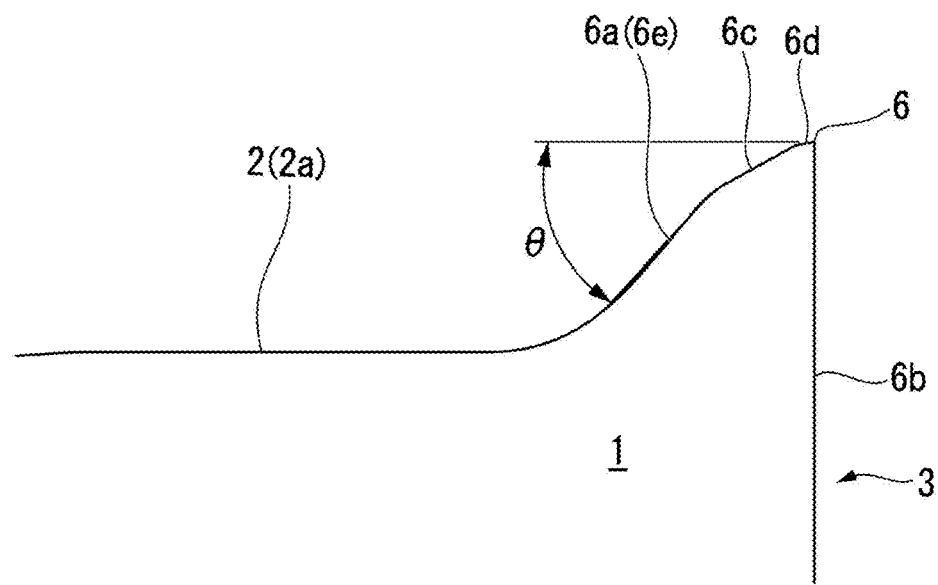
FIG. 14 is a sectional view taken along line DD in FIG. 2.
Figure 15:
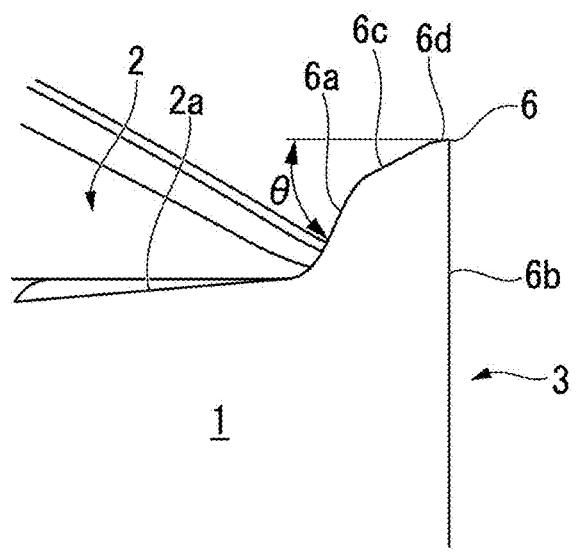
FIG. 15 is a sectional view taken along line EE in FIG. 2.
Figure 16:
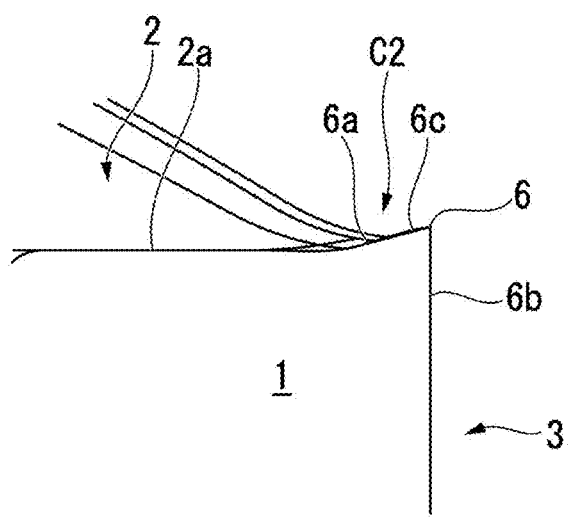
FIG. 16 is a sectional view taken along line FF in FIG. 2.
Figure 17:
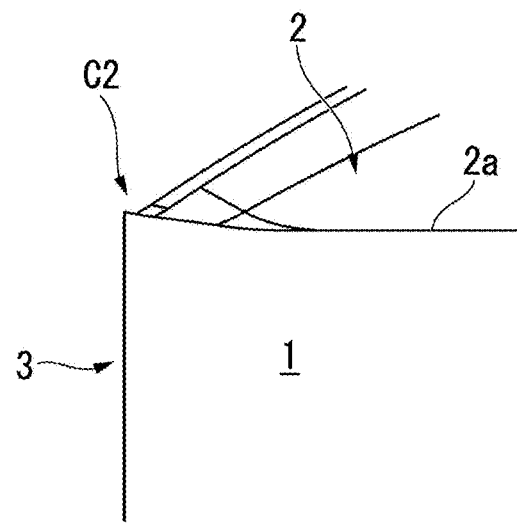
FIG. 17 is a sectional view taken along line GG in FIG. 2.
Figure 18:
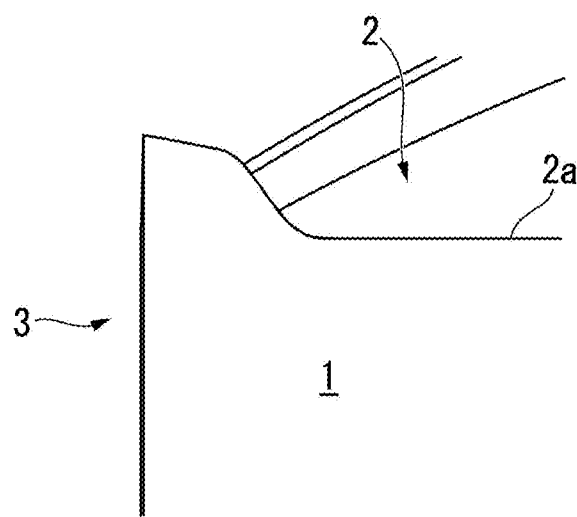
FIG. 18 is a sectional view taken along line HH in FIG. 2.
Figure 19:
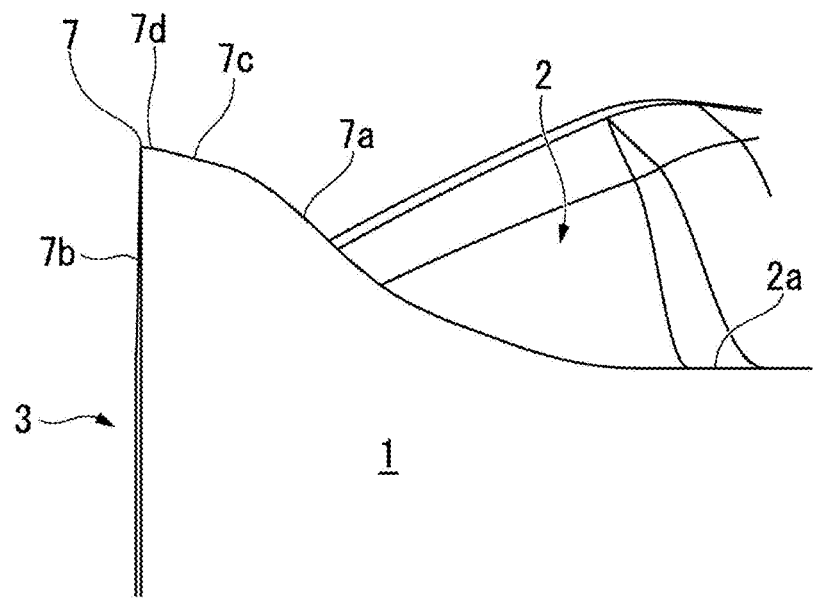
FIG. 19 is a sectional view taken along line II in FIG. 2.
Figure 20:
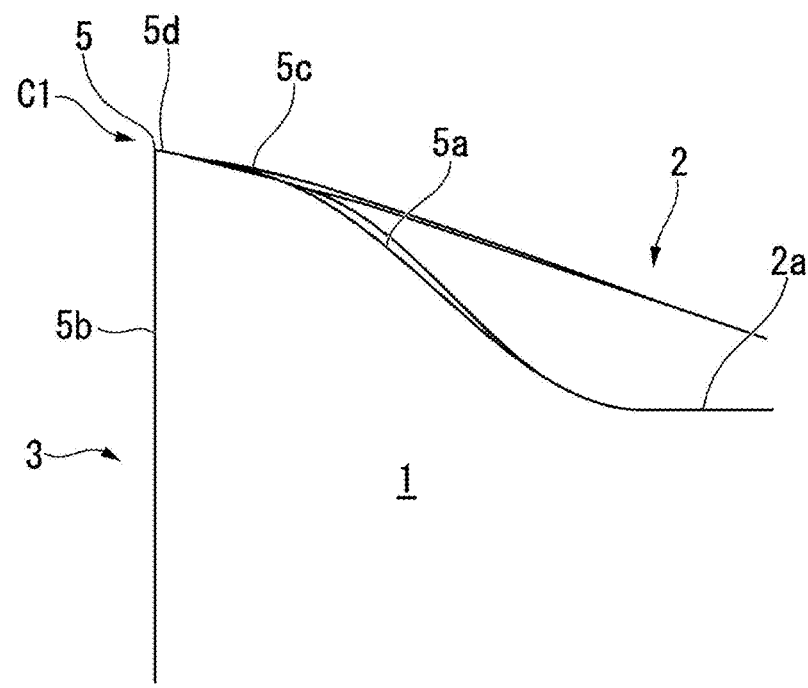
FIG. 20 is a sectional view taken along line JJ in FIG. 2.

On a corner edge 5 side, the main cutting edge 6 connected to the first end portion 5A of the corner edge 5 goes away from the hexagonal surface 2, which forms a convex curve, such as a convex arc, and is opposite to the hexagonal surface 2 on which the main cutting edge 6 is formed, and then extends toward the opposite hexagonal surface 2 side to the hexagonal surface 2 on which the main cutting edge 6 is formed, as going from the first end portion 5A of the corner edge toward a second corner portion C2 side, which is the opposite side to the first corner portion C1 with the main cutting edge 6 placed therebetween, in side view perpendicularly facing the main clearance surface 6b intersecting the main rake surface 6a among the plurality of side surfaces 3 of the insert main body 1, as illustrated in FIGS. 9 and 10.

In a case where the main cutting edge 6 is formed on the first polygonal surface (the one hexagonal surface 2), the main cutting edge 6 goes away from the second polygonal surface (the other hexagonal surface 2) while forming a convex curve, such as a convex arc, on the corner edge 5 side and then extends toward a second polygonal surface (the hexagonal surface 2) side, as going from the second end portion 5B of the corner edge 5 of the first polygonal surface toward the second corner portion C2.

In the side view perpendicularly facing the main clearance surface 6b, a curvature radius R of the convex curve formed by the main cutting edge 6 on the corner edge 5 side is within a range of 3 mm to 10 mm, and the main cutting edge 6 forms the convex curve at least within a range of 1.0 mm from the first end portion 5A of the corner edge 5. On the second corner portion C2 side from this range, the main cutting edge 6 may extend to the opposite hexagonal surface 2 side while forming the convex curve in the side view, may extend in a straight line shape to the opposite hexagonal surface 2 side, or may form a concave curve.

Figure 3:
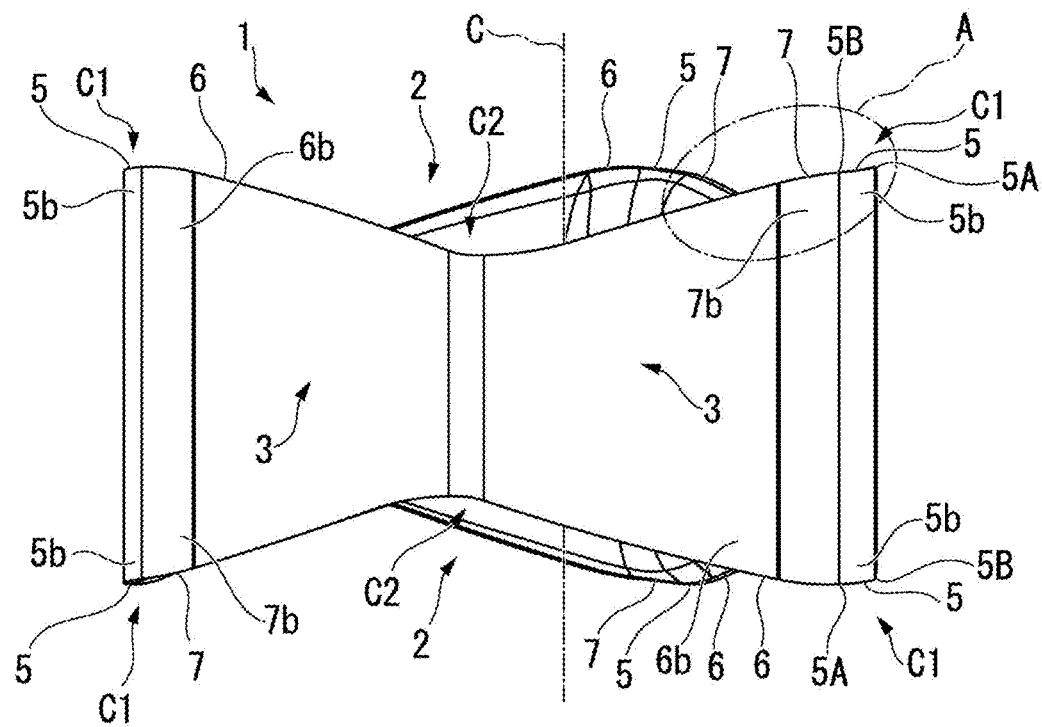
FIG. 3 is a side view seen from an arrow V direction in FIG. 2.
Figure 4:
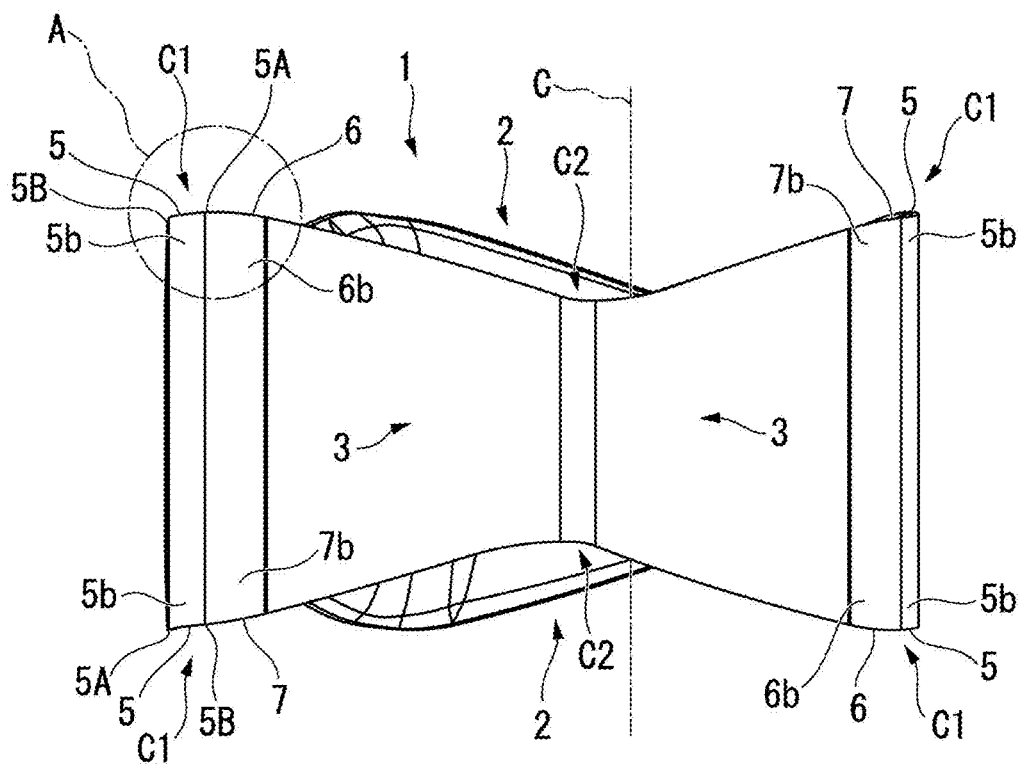
FIG. 4 is a side view seen from an arrow W direction in FIG. 2.

In side view perpendicularly facing the auxiliary clearance surface 7b intersecting the auxiliary rake surface 7a via the auxiliary cutting edge 7, among the plurality of side surfaces 3 of the insert main body 1, the auxiliary cutting edge 7 is formed to extend from the second end portion 5B of the corner edge 5 along a plane P perpendicular to the insert center line C, or is formed to extend toward the opposite hexagonal surface 2 side to the hexagonal surface 2, on which the auxiliary cutting edge 7 is formed, as separating away from the second end portion 5B of the corner edge 5. In the present embodiment, the auxiliary cutting edge is formed to extend toward the opposite hexagonal surface 2 side as separating away from the second end portion 5B of the corner edge 5 as illustrated in FIGS. 3 and 9.

In a case where the auxiliary cutting edge 7 is formed on the first polygonal surface (the one hexagonal surface 2), the auxiliary cutting edge 7 extends toward the second polygonal surface (the other hexagonal surface 2) side as going from the second end portion 5B of the corner edge 5 on the first polygonal surface toward the second corner portion C2 in the present embodiment. In the side view facing the auxiliary clearance surface 7b, an inclination angle α of the auxiliary cutting edge 7 with respect to the plane P perpendicular to the insert center line C is within a range of 0° to 15°. In a case where the auxiliary cutting edge 7 extends along the plane P perpendicular to the insert center line C, the inclination angle α is 0°.

While the main cutting edge 6 extends in a range from the first end portion 5A of the corner edge 5 to the second corner portion C2 on the first end portion 5A side, the auxiliary cutting edge 7 extends in a range from the second end portion 5B of the corner edge 5 to the second corner portion C2 on a second end portion 5B side, which is shorter than that of the main cutting edge 6. In a portion from an end portion of the auxiliary cutting edge 7 on the opposite side to the second end portion 5B of the corner edge 5 to the second corner portion C2, the intersecting ridge line portion between the hexagonal surface 2 and the side surface 3 is inclined toward the opposite hexagonal surface 2 side at an angle larger than the inclination angle α of the auxiliary cutting edge 7, and this portion is not used in cutting.

The corner rake surface 5a, the main rake surface 6a, and the auxiliary rake surface 7a include, on the corner edge 5 side, a main cutting edge 6 side, and an auxiliary cutting edge 7 side respectively, land portions 5c, 6c, and 7c that extend toward the opposite hexagonal surface 2 side as going toward the inner side of the hexagonal surface 2 at a constant inclination angle with respect to the plane perpendicular to the insert center line C, which is gentler than the corner rake surface 5a, the main rake surface 6a, and the auxiliary rake surface 7a, in sections perpendicular to the corner edge 5, the main cutting edge 6, and the auxiliary cutting edge 7, in plan view seen from a direction facing the hexagonal surface 2 along the insert center line C as illustrated in FIGS. 11 to 16 and FIGS. 19 and 20.

Between the land portions 5c, 6c, and 7c of the corner rake surface 5a, the main rake surface 6a, and the auxiliary rake surface 7a and the corner edge 5, the main cutting edge 6, and the auxiliary cutting edge 7, honing portions 5d, 6d, and 7d are respectively formed toward the opposite hexagonal surface 2 side as going toward the inner side of the hexagonal surface 2 at an inclination angle with respect to the plane perpendicular to the insert center line C, which is even gentler than the land portions 5c, 6c, and 7c. The honing portions 5d, 6d, and 7d each have a width smaller than the land portions 5c, 6c, and 7c in the sections. The honing portions 5d, 6d, and 7d may also be formed along the plane perpendicular to the insert center line C in the sections.

The corner rake surface 5a, the main rake surface 6a, and the auxiliary rake surface 7a each are formed such that each rake surface forms a convex curve to be in contact with the land portions 5c, 6c, and 7c respectively in the sections so as to extend in a straight line shape to the opposite hexagonal surface 2 side as going toward the inner side of the hexagonal surface 2, and further forms a concave curve to be in contact with the flat portion 2a of the hexagonal surface 2.

In the present embodiment, since the corner edge 5 is formed to go away from the second end portion 5B in a concave curve shape and to protrude as going toward the first end portion 5A in the side view facing the corner clearance surface 5b as described above, the corner rake surface 5a and the land portion 5c thereof are also formed to protrude in the insert center line C direction while forming a concave curved surface, as going from a boundary line L with the auxiliary rake surface 7a and the land portion 7c thereof toward a boundary line M with the main rake surface 6a and the land portion 6c thereof.

In the present embodiment, since the main cutting edge 6, on the corner edge 5 side, goes away from the opposite hexagonal surface 2 while forming a convex curve, and then extends toward the opposite hexagonal surface 2 side, as going from the first end portion 5A of the corner edge 5 toward the second corner portion C2 side in the side view facing the main clearance surface 6b, the main rake surface 6a and the land portion 6c thereof also go away from the opposite hexagonal surface 2 while forming a convex curved surface as going from the boundary line M with the corner rake surface 5a and the land portion 5c thereof toward the second corner portion C2 side, and then extend toward the opposite hexagonal surface 2 side.

In the plan view seen from the direction facing the hexagonal surface 2 along the insert center line C direction as illustrated in FIG. 2, the boundary line M between the main rake surface 6a and the land portion 6c thereof and the corner rake surface 5a and the land portion 5c thereof, which extends from the first end portion 5A of the corner edge 5 to the inner side of the hexagonal surface 2, intersects the main cutting edge 6 at an intersection angle β within a range of 20° to 60°.

In the cutting insert having the configuration, the main cutting edge 6 includes, at least on the corner edge 5 side, a rake angle gradual increase region 6e where a rake angle θ of the main rake surface 6a gradually increases to a positive angle side as going from the first end portion 5A of the corner edge 5 toward the second corner portion C2 side. In the rake angle gradual increase region 6e, the rake angle θ, which is an angle formed by the main rake surface 6a with respect to the plane perpendicular to the insert center line C in a section perpendicular to the main cutting edge 6 in the plan view seen from the direction facing the hexagonal surface 2 along the insert center line C, gradually increases as separating away from the first end portion 5A of the corner edge 5 along the main cutting edge 6 as illustrated FIGS. 11 to 14.

In the present embodiment, the rake angle gradual increase region 6e is formed within a range N of 1.0 mm to 2.0 mm from the first end portion 5A of the corner edge 5 in the plan view facing the hexagonal surface 2 when viewed from the insert center line C direction. In the present embodiment, the rake angle θ of the main rake surface 6a is constant on the second corner portion C2 side of the rake angle gradual increase region 6e. The gradual increase amount of the rake angle θ in the rake angle gradual increase region 6e, that is, a difference in the rake angle θ of the main rake surface 6a between the first end portion 5A of the corner edge 5 and an end edge of the rake angle gradual increase region 6e on the opposite side of the first end portion 5A is 5° or more.

Such a cutting insert is detachably attached by clamp screw 13 to an insert attachment seat 12 formed on a tip portion outer periphery of a tool main body 11 according to the embodiment of the cutting edge replacement type cutting tool of the present invention illustrated in FIGS. 21 and 22, and configures the cutting edge replacement type cutting tool (cutting edge replacement type milling cutter) of the embodiment illustrated in FIGS. 23 to 27.

In the present embodiment, the tool main body 11 is formed in a substantially disk shape which has a large diameter at the tip portion (lower portion in FIG. 25) and is centered on an axis O. A chip pocket 14 extending to a rear end side is formed on the outer periphery of the tip portion. The insert attachment seat 12 is formed in a wall surface of the chip pocket 14, which faces a tool rotation direction T, as a concave portion opened in the wall surface and a tip surface and an outer peripheral surface of the tool main body 11. In the present embodiment, a plurality of (four) chip pockets 14 and a plurality of (four) insert attachment seats 12 are formed at equal intervals in the circumferential direction.

The insert attachment seat 12 includes, as illustrated in FIGS. 21 and 22, an annular flat bottom surface 12a that faces the tool rotation direction T, a wall surface 12b that rises to a tool rotation direction T side perpendicularly to the bottom surface 12a and faces a tip outer peripheral side of the tool main body 11, and a wall surface 12c that faces a tip inner peripheral side.

The bottom surface 12a is slightly inclined toward the tool rotation direction T as going toward the rear end side of the tool main body 11, and in a center portion thereof, a screw hole 12d, into which the clamp screw 13 is screwed, is formed. Run-off portions that prevent interference with the insert main body 1 are formed between the bottom surface 12a and the wall surfaces 12b and 12c, and in intersecting ridge line portions between the tip surface and the outer peripheral surface of the tool main body 11 and the bottom surface 12a.

Figure 23:
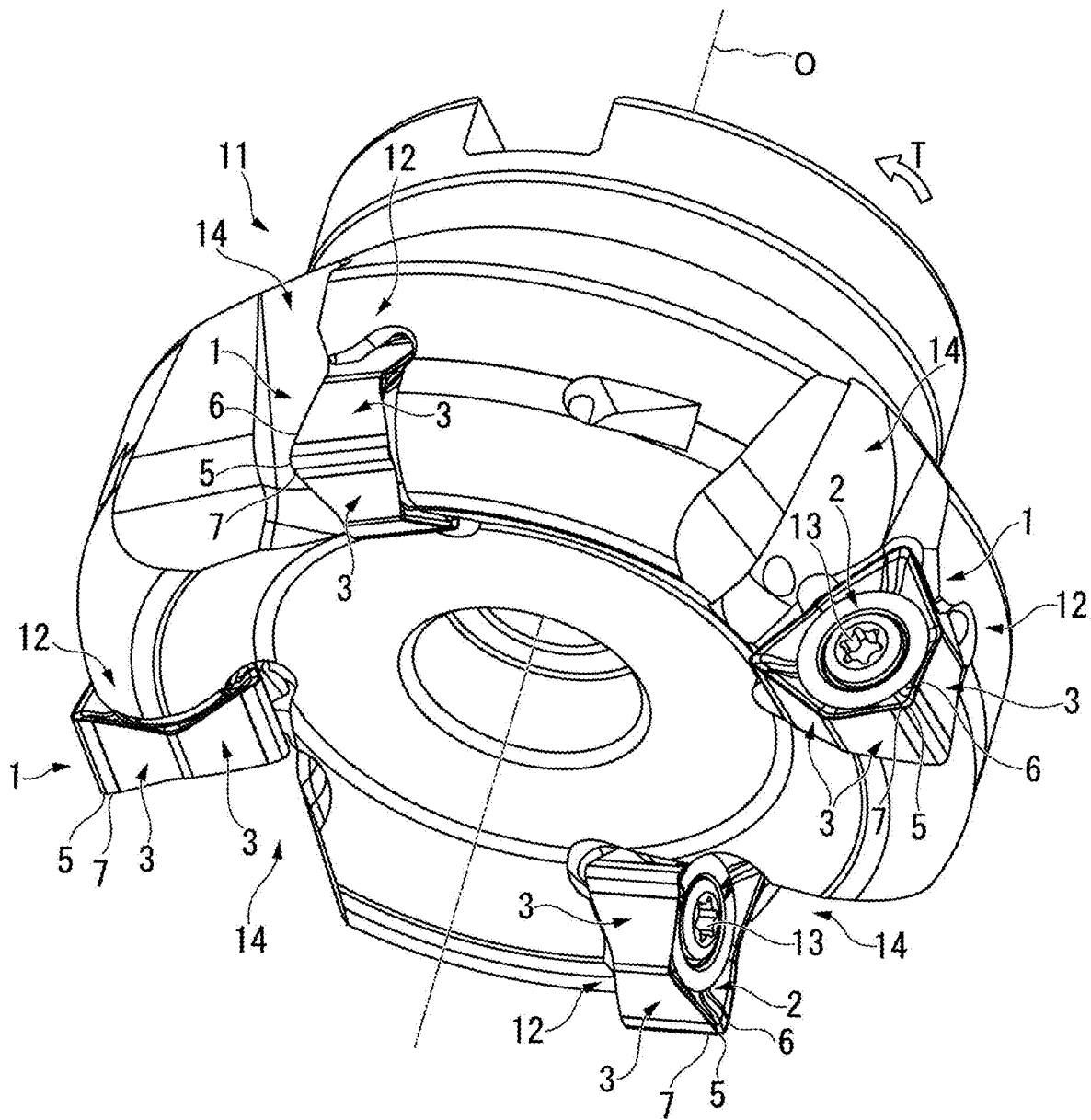
FIG. 23 is a perspective view illustrating the embodiment of the cutting edge replacement type cutting tool of the present invention.
Figure 24:
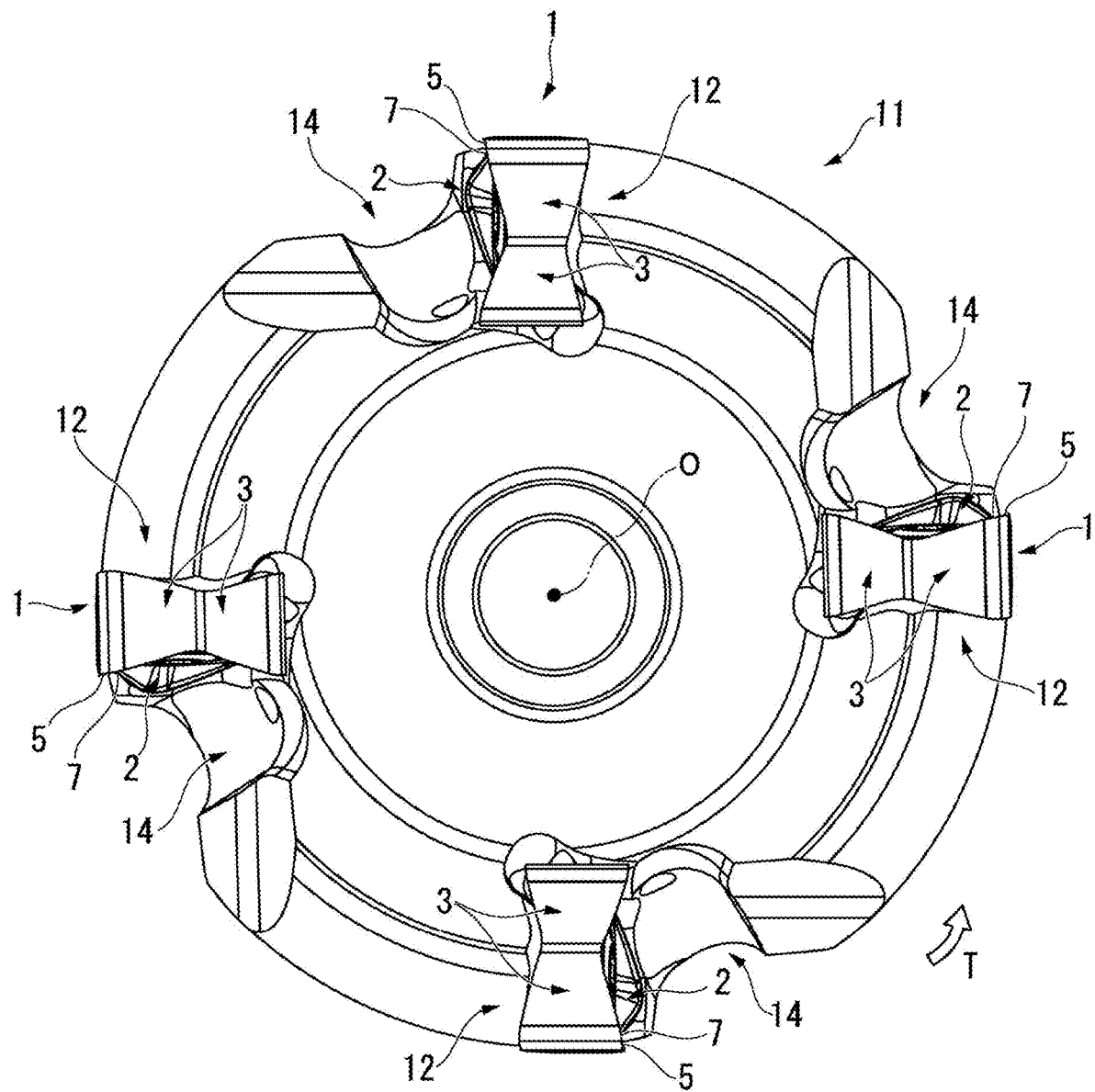
FIG. 24 is a bottom view of the embodiment illustrated in FIG. 23.

The cutting insert of the embodiment is seated on such an insert attachment seat 12. In this state, one hexagonal surface 2 of the insert main body 1 faces the tool rotation direction T, and one corner edge 5 of the one hexagonal surface 2 protrudes to the tip outer peripheral side of the tool main body 11 as illustrated in FIGS. 23 and 25.

Figure 25:
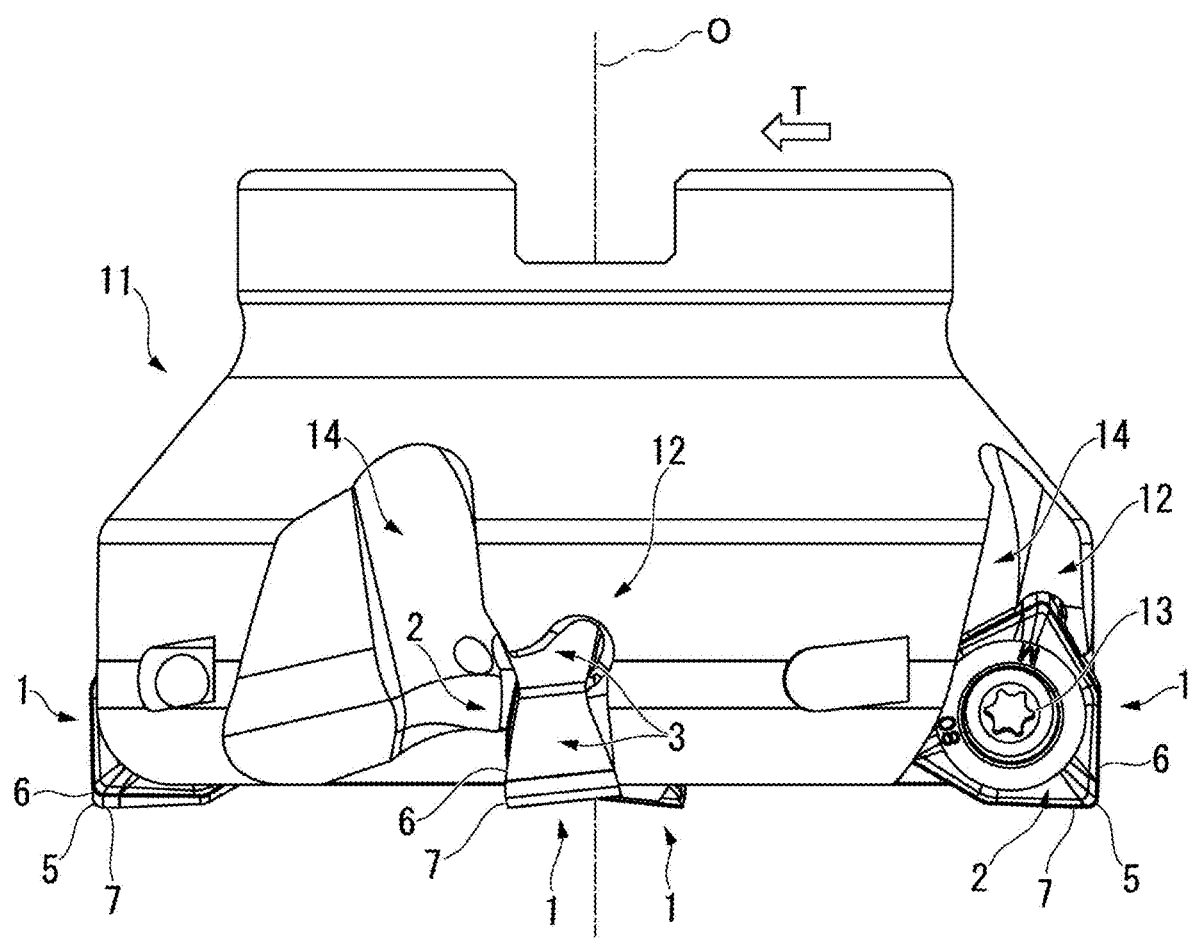
FIG. 25 is a side view of the embodiment illustrated in FIG. 23.
Figure 26:
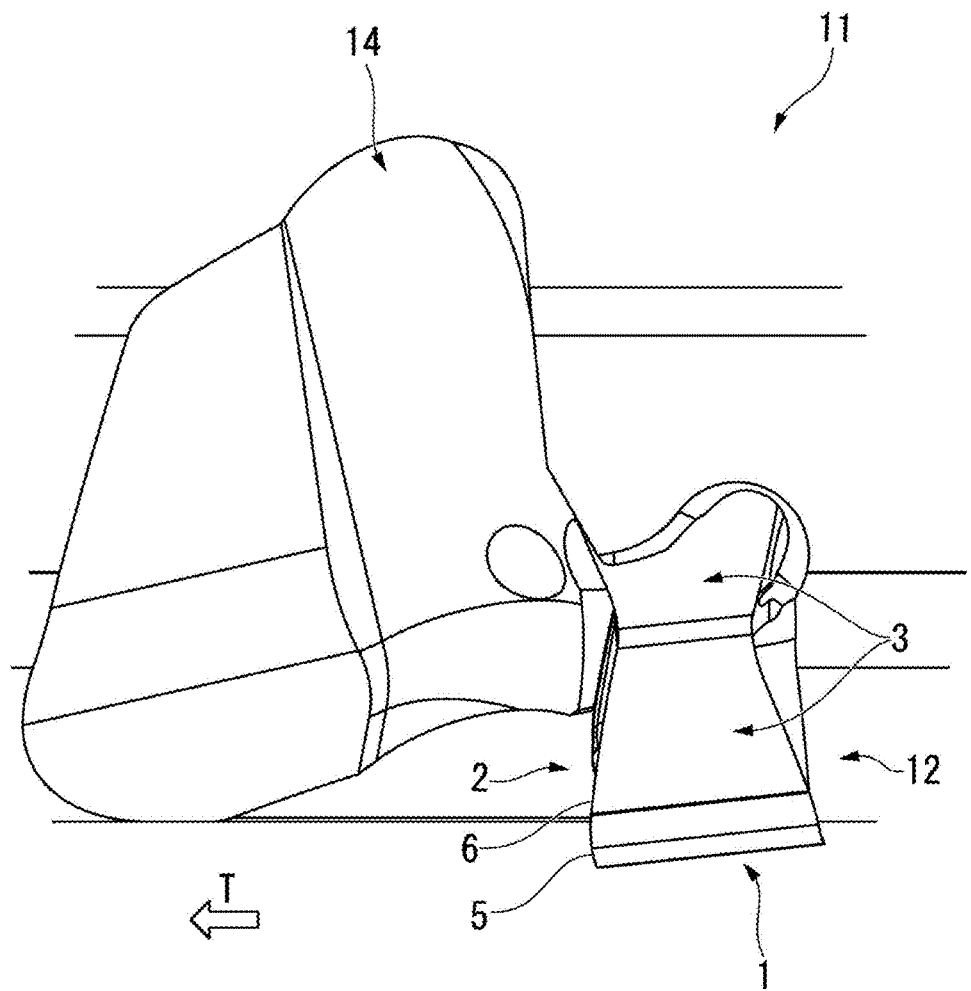
FIG. 26 is an enlarged side view around the insert attachment seat of the embodiment illustrated in FIG. 23.
Figure 27:
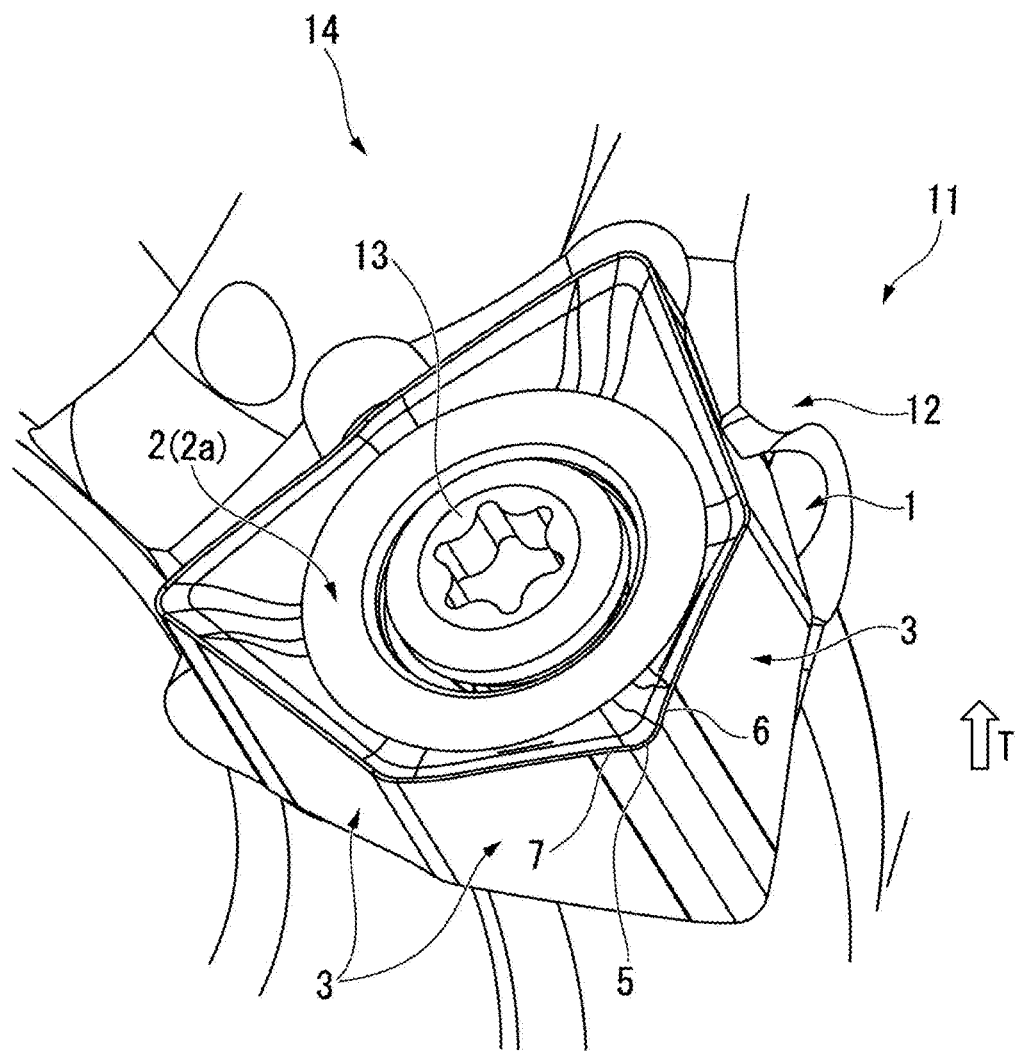
FIG. 27 is an enlarged perspective view around the insert attachment seat of the embodiment illustrated in FIG. 23.

The main cutting edge 6 connected to the corner edge 5 protrudes to the outer peripheral side of the tool main body 11 as illustrated in FIG. 25, and extends to the opposite side in the tool rotation direction T as going toward the rear end side as illustrated in FIG. 26. In addition, the auxiliary cutting edge 7 connected to the corner edge 5 protrudes to a tip side of the tool main body 11 as illustrated in FIG. 25, and extends slightly to the rear end side on a plane perpendicular to the axis O or as going toward an inner peripheral side of the tool main body 11.

The flat portion 2a, which is a center portion of the other hexagonal surface 2 opposite to the one hexagonal surface 2 of the insert main body 1, comes into close contact with the bottom surface 12a of the insert attachment seat 12. Two side surfaces 3 of the insert main body 1, on which the auxiliary clearance surface 7b connected to the two auxiliary cutting edges 7 on the one hexagonal surface 2 is formed, other than the remaining auxiliary cutting edge 7 facing the tip side of the tool main body 11, come into contact with the wall surfaces 12b and 12c of the insert attachment seat 12. A wall surface between the wall surfaces 12b and 12c does not come into contact with the insert main body 1 seated in such a manner, and a slight interval is provided between the facing side surfaces 3.

By screwing the clamp screw 13 inserted in the attachment hole 4 into the screw hole 12d, the flat portion 2a of the other hexagonal surface 2 is pressed against the bottom surface 12a, and the two side surfaces 3 are pressed against the wall surfaces 12b and 12c respectively so as to be fixed to the insert attachment seat 12, thereby attaching the insert main body 1 seated in such a manner to the tool main body 11.

The cutting insert configured in such a manner and the cutting edge replacement type cutting tool, to which the cutting insert is attached, include, on the corner edge 5 side, which is on the tip side of the tool main body 11, of the main cutting edge 6 protruding to the outer peripheral side of the tool main body 11, the rake angle gradual increase region 6e where the rake angle θ of the main rake surface 6a gradually increases to the positive angle side as going from the first end portion 5A of the corner edge 5 toward the second corner portion C2 side positioned on the rear end side of the tool main body 11.

For this reason, since a chip generated by the main cutting edge 6 from the corner edge 5 side flows along the main rake surface 6a having the large rake angle θ on the rear end side of the main cutting edge 6 and a space that is larger on the tool rotation direction T side than on the tip side is secured on the rear end side, a curl having a larger radius on the rear end side of the main cutting edge 6 than on the tip side is made. Accordingly, the chip flows out in a direction separating away from the main cutting edge 6 as the center line of the curl faces from the tip to the rear end, that is, a direction toward the inner peripheral side as going toward the rear end side of the tool main body 11, and the chip is discharged while imparting a curling tendency so that the chip is curled in the same direction.

FIG. 28 illustrates the states (1) to (3) in which a chip is generated by the cutting insert of the embodiment. FIG. 29 illustrates the states (1) to (3) in which a chip is generated by the cutting insert having a constant rake angle of the main cutting edge described in Patent Literature 1. FIGS. 28 and 29 simulate a case where work material: SCM440 is cut under cutting conditions of a cutting speed: 160 m/min, depth of cut: 2.0 mm, feeding per edge: 0.2 mm/t, a diameter of the main cutting edge 6 about the axis O: 80 mm, and the curvature radius R of the convex curve formed by a portion of the main cutting edge on the corner edge side when viewed from a direction facing the main rake surface is 5.2 mm. The left side of each drawing of FIGS. 28 and 29 is a view of the insert main body viewed from the tool rotation direction, and the right side is a view seen from the outer peripheral side of the tool main body.

From the results of FIGS. 28 and 29, in FIG. 29 illustrating a case where the rake angle of the main cutting edge is constant, the radius of the curl of the chip is large on the tip side (lower side of each drawing of FIG. 29) of the main cutting edge, the radius of the curl of the chip is small on the rear end side (upper side of each drawing of FIG. 29), and the center line of the curl extends to the outer peripheral side (right side of each left drawing of FIG. 29) of the tool main body as going toward the rear end side. For this reason, it can be seen that there is a possibility in which the chip comes into contact with a wall surface of the work material, which is formed by the main cutting edge, or the chip is caught between the wall surface and the main cutting edge.

Contrary to FIG. 29, in FIG. 28, the radius of the curl of the chip is small on the tip side (lower side of each drawing of FIG. 28) of the main cutting edge, the radius of the curl of the chip is large on the rear end side (upper side of each drawing of FIG. 28), and the center line of the curl extends to the inner peripheral side (left side of each left drawing of FIG. 28) of the tool main body as going toward the rear end side. It can be seen that a discharge direction of the chip is controlled so as to be separated away from the wall surface of the work material cut by the main cutting edge. In FIG.

28, the rake angle gradual increase region is within a range of approximately 1.0 mm from the first end portion of the corner edge, and the rake angle θ gradually increases from 20° to 30°.

As described above, with the cutting insert having the configuration and the cutting edge replacement type cutting tool, it is possible to avoid a situation in which a chip generated by the main cutting edge 6 comes into contact with the cut wall surface of the work material or is caught between the insert main body 1 and the wall surface. For this reason, even under cutting conditions in which the depth of cut is large, a finished surface (wall surface) can be prevented from being damaged as such a chip is caught in, an increase in a cutting resistance can also be suppressed, a high-quality and high-accuracy finished surface can be formed, and it is possible to prevent chatter vibration from occurring even when cutting a thin plate.

In the present embodiment, the rake angle gradual increase region 6e is formed within the relatively short range N of 1.0 mm to 2.0 mm from the first end portion 5A of the corner edge 5 in the plan view facing the hexagonal surface 2. When the rake angle gradual increase region 6e is formed even within such a short range N, it is possible to control the discharge direction of a chip by making the curl radius of the chip on the tip side (the corner edge 5 side) of the main cutting edge 6 small as illustrated in FIG. 28 and imparting a curling tendency as described above. In a case where the rake angle gradual increase region 6e is shorter than 1.0 mm from the first end portion 5A of the corner edge 5, there is a possibility that the curling tendency cannot be sufficiently imparted to the chip.

In the present embodiment, since the rake angle θ of the main rake surface 6a is constant in a portion on the second corner portion C2 side from the rake angle gradual increase region 6e exceeding the first end portion 5A of the corner edge 5 by 2.0 mm, an edge angle of the main cutting edge does not become needlessly small on the rear end side (the second corner portion C2 side) of the main cutting edge 6, and a defect or chipping can be prevented from occurring in the main cutting edge 6 even in a case where the depth of cut is large. However, the rake angle θ of the main rake surface 6a may be formed to gradually increase even in a range exceeding the first end portion 5A of the corner edge 5 by 2.0 mm.

In the present embodiment, the gradual increase amount of the rake angle θ of the main rake surface 6a in the rake angle gradual increase region 6e is 5° or more. Accordingly, a curling tendency in which a curl radius decreases can be reliably imparted to a chip generated on the corner edge 5 side of the main cutting edge 6. When the gradual increase amount of the rake angle θ in the rake angle gradual increase region 6e is less than 5°, there is a possibility that it is difficult to reliably impart a curling tendency, in which a curl radius of the chip is small on the corner edge 5 side of the main cutting edge 6 and the discharge direction faces the direction toward the inner peripheral side as going toward the rear end side of the tool main body as described above.

Although the land portion 6c and the honing portion 6d are formed on the main cutting edge 6 side of the main rake surface 6a in the present embodiment, the inclination angle of the land portion 6c or the honing portion 6d with respect to the plane perpendicular to the insert center line C, that is, the rake angle may gradually increase in conjunction with the rake angle gradual increase region 6e of the main rake surface 6a as separating away from the first end portion 5A of the corner edge 5, or may be constant.

In the present embodiment, the boundary line M between the main rake surface 6a and the corner rake surface 5a, which extends from the first end portion 5A of the corner edge 5 to the inner side of the hexagonal surface 2, intersects the main cutting edge 6 at the intersection angle β within a range of 20° to 60° in the plan view seen from the direction facing the hexagonal surface 2 along the insert center line C, and the rake angle gradual increase region 6e of the main rake surface 6a extends from a boundary line N inclined in this manner with respect to the main cutting edge 6. For this reason, the discharge direction of a chip is more reliably controlled so as to be the direction separating away from the main cutting edge 6, and thus it is possible to prevent the chip from being caught in.

When the intersection angle β is less than 20°, there is a possibility that the boundary line M becomes too close to the main cutting edge 6 in the plan view and it becomes difficult to reliably control the discharge direction of the chip so as to be the direction separating away from the main cutting edge 6. On the other hand, when the intersection angle β exceeds 60°, it is difficult for the chip to be discharged to the rear end side of the tool main body 11, and the chip flowed out to the inner peripheral side of the tool main body 11 abuts against the wall surface of the chip pocket 14, which faces the outer peripheral side of the tool main body 11 and flows to the outer peripheral side. Thus, a possibility that the chip is caught between the main cutting edge 6 and the wall surface of the work material formed by the main cutting edge 6 arises.

In the present embodiment, the corner edge 5 is formed to go away from the hexagonal surface 2 opposite to the hexagonal surface 2, on which the corner edge 5 is formed, as going toward the first end portion 5A, and to extend in a direction protruding in the insert center line C direction. For this reason, a smaller curl radius is adopted to roll up a tip portion of a chip generated by the tip portion of the main cutting edge 6 from the corner edge 5. Thus, it is possible to control the discharge direction so as to face the inner peripheral side as going further toward the rear end side of the tool main body 11.

In the present embodiment, the corner edge 5 is formed in a concave curve shape in the side view facing the corner clearance surface 5b, and a tip portion of a chip generated along the concave curve can be curled in a smaller radius. Since the corner rake surface 5a is also formed in a concave curved surface, the tip portion of the chip can be curled in a smaller radius. Therefore, since the center line of the curl of the chip is more reliably separated away from the main cutting edge and the discharge direction can be controlled so as to be the direction toward the inner peripheral side as going toward the rear end side of the tool main body 11, the chip can be effectively prevented from being caught in. However, when the first end portion 5A protrudes from the second end portion 5B, the corner edge 5 may be in a straight line shape in the side view.

In the present embodiment, in a case of forming the corner edge 5 to extend in the direction protruding in the insert center line C direction as going toward the first end portion 5A as described above, the protruding amount t of the first end portion 5A in the insert center line C direction with respect to the second end portion 5B of the corner edge 5 on the opposite side thereof in the side view facing the corner clearance surface 5b is within a range of 0.05 mm to 0.15 mm. Accordingly, the discharge direction of a chip can be more effectively controlled, and a defect can be prevented from occurring in the corner edge 5 or the main cutting edge 6 at the first end portion 5A.

When the protruding amount t is small enough to be less than 0.05 mm, there is a possibility that an effect of controlling the discharge direction of the chip so as to be the direction toward the inner peripheral side as going toward the rear end side of the tool main body 11 as described above decreases. On the other hand, when the protruding amount t exceeds 0.15 mm, there is a possibility that the intersection angle between the corner edge 5 and the main cutting edge 6 is small at the first end portion 5A of the corner edge 5 and a defect or chipping is likely to occur in the corner edge 5 or the main cutting edge 6 at the first end portion 5A.

The insert main body 1 of the cutting insert of the present embodiment has the insert center line C passing through the centers of the hexagonal surfaces 2 (first and second polygonal surfaces) on the front and back. The auxiliary cutting edge 7, which has the auxiliary rake surface 7a connected to the corner rake surface 5a on the opposite side of the main rake surface 6a of each of the hexagonal surfaces 2 and extends from the second end portion 5B on the opposite side of the first end portion 5A of the corner edge 5, is formed on the hexagonal surface 2. A bottom surface of a machined surface of the work material can be smoothly finished by the auxiliary cutting edge 7.

In the present embodiment, the auxiliary cutting edge 7 is formed to extend toward the opposite hexagonal surface 2 side to the hexagonal surface 2, on which the auxiliary cutting edge 7 is formed, as separating away from the second end portion 5B of the corner edge 5, in the side view facing the auxiliary clearance surface 7b. The auxiliary cutting edge 7 can generate a chip continuous from the corner edge 5 to the inner peripheral side of the tool main body 11 so as to be pulled into the inner peripheral side of the tool main body 11. For this reason, the center line of the curl of the chip is more reliably guided to face the inner peripheral side as going toward the rear end side of the tool main body 11, and thereby it is possible to control the discharge direction.

In a case where the auxiliary cutting edge 7 is formed in this manner, the auxiliary cutting edge 7 is formed from the second end portion 5B of the corner edge 5 along the plane P perpendicular to the insert center line C in the side view facing the auxiliary clearance surface 7b, or may have the inclination angle α of 0° with respect to the plane P, that is, may be formed in a direction separating away from the opposite hexagonal surface 2 as separating away from the second end portion 5B of the corner edge 5 so as not to extrude a chip to the outer peripheral side of the tool main body 11. However, when the inclination angle α is excessively large, the chip is excessively pulled in to the inner peripheral side of the tool main body 11, it is difficult for the chip to be discharged to the rear end side, and the chip stays in the chip pocket 14 and is likely to be caught in. Thus, it is desirable that the inclination angle α is 15° or less.

In the present embodiment, on the corner edge 5 side on which the rake angle gradual increase region 6e of the main rake surface 6a is formed, the main cutting edge 6 is formed to go away from the opposite hexagonal surface 2 (second polygonal surface) while forming a convex curve as going from the first end portion 5A of the corner edge 5 toward the second corner portion C2 side and then to extend toward the opposite hexagonal surface 2 side, in the side view facing the main clearance surface 6b. This characteristic configuration can also be applied to a case where the rake angle gradual increase region 6e is not provided.

For this reason, since a tip portion of a chip on the corner edge 5 side is generated to be thin by being stretched in a convex curve shape in a section along a convex curve formed by the main cutting edge 6, the chip is likely to be rolled up in an even smaller curl radius. Therefore, the curl radius of the tip portion of the chip is made more reliably smaller than the rear end portion, and the center line of the curl is caused to face the inner peripheral side as going toward the rear end side of the tool main body 11. Thus, the chip discharge direction can be controlled.

Therefore, it is possible to avoid that a chip generated by the main cutting edge 6 comes into contact with the cut wall surface of the work material or is caught between the insert main body 1 and the wall surface. For this reason, even under cutting conditions in which the depth of cut is large, a finished surface (wall surface) can be prevented from being damaged as such a chip is caught in, an increase in a cutting resistance can also be suppressed, a high-quality and high-accuracy finished surface can be formed, and it is possible to prevent chatter vibration from occurring even when cutting a thin plate.

In a case where the main cutting edge 6, on the corner edge 5 side, goes away from the opposite hexagonal surface 2 while forming a convex curve as going from the first end portion 5A toward the second corner portion C2 side and then extends toward the opposite hexagonal surface 2 side in the side view facing the main clearance surface 6b, the curvature radius R of the convex curve formed by the main cutting edge 6 is within a range of 3 mm to 10 mm as in the present embodiment, and it is desirable that the convex curve is formed at least within a range of 1.0 mm from the first end portion 5A of the corner edge 5.

When the curvature radius R of the convex curve formed by the main cutting edge 6 is less than 3 mm, there is a possibility that the main cutting edge 6 becomes a protrusion at this portion and a defect is likely to occur. On the other hand, when the curvature radius R exceeds 10 mm, the convex curve becomes flat. Thus, there is a possibility that an effect of controlling the discharge direction of a chip is lost as described above. Even in a case where the range of the convex curve formed by the main cutting edge 6 is shorter than a range of 1.0 mm from the first end portion 5A of the corner edge 5, there is a possibility that the effect of controlling the discharge direction of the chip cannot be sufficiently achieved.

Further, in the present embodiment, the insert main body 1 is formed in a hexagonal plate shape that is a rotationally symmetric shape by every 120° about the insert center line C passing through the centers of the two hexagonal surfaces 2, which are the first and second polygonal surfaces, and is a front-back inverted symmetric shape with respect to the two hexagonal surfaces 2. Three first corner portions C1 and three second corner portions C2 are alternately disposed in the circumferential direction on each of the two hexagonal surfaces 2, and are disposed on the opposite sides to each other in the insert center line C direction. Between the two hexagonal surfaces 2, the first end portion 5A and the second end portion 5B of the corner edge 5 are disposed on the opposite sides to each other in the circumferential direction of the insert main body 1. Therefore, the main cutting edges 6 and the auxiliary cutting edges 7 of the hexagonal surfaces 2 on the front and back are formed to extend from the first and second end portions 5A and 5B in opposite directions to each other in the circumferential direction.

The cutting insert of the present embodiment is a one-sided cutting insert, and allows the use of the corner edge 5, the main cutting edge 6, and the auxiliary cutting edge 7 three times for each of the hexagonal surfaces 2 on the front and back of one insert main body 1, in total six times.

In addition, since the cutting insert of the present embodiment is a negative type cutting insert, in which the side surface 3 of the insert main body 1, on which the corner clearance surface 5b, the main clearance surface 6b, and the auxiliary clearance surface 7b are formed, is formed to extend parallel to the insert center line C, the strength of the cutting edge can be improved by securing the edge angle of each of the corner edge 5, the main cutting edge 6, and the auxiliary cutting edge 7, and chipping or a defect can be prevented from occurring in the corner edge 5, the main cutting edge 6, and the auxiliary cutting edge 7.

INDUSTRIAL APPLICABILITY

With the present invention, by making the curl radius of a tip portion of a chip on the corner edge side smaller than the rear end portion and curling the chip about the curl center line toward the inner peripheral side as going toward the rear end side of the tool main body, the discharge direction of the chip can be controlled so as to be a direction separating away from the wall surface of the work material formed by the main cutting edge, and accordingly, the chip can be prevented from being caught between the wall surface and the main cutting edge. Accordingly, the present invention can be used industrially.

REFERENCE SIGNS LIST 1 insert main body
2 hexagonal surface (first and second polygonal surfaces)
3 side surface
4 attachment hole
5 corner edge
5A first end portion of corner edge 5
5B second end portion of corner edge 5
5a corner rake surface
5b corner clearance surface
6 main cutting edge
6a main rake surface
6b main clearance surface
6e rake angle gradual increase region
7 auxiliary cutting edge
7a auxiliary rake surface
7b auxiliary clearance surface
11 tool main body
12 insert attachment seat
13 clamp screw
C insert center line
L boundary line between corner rake surface 5a and land portion 5c thereof and auxiliary rake surface 7a and land portion 7c thereof
M boundary line between corner rake surface 5a and land portion 5c thereof and main rake surface 6a and land portion 6c thereof
N range where rake angle gradual increase region 6e is formed
P plane perpendicular to insert center line C extending from second end portion 5B of corner edge 5
t protruding amount of first end portion 5A of corner edge 5 with respect to second end portion 5B
R curvature radius of convex curve formed by main cutting edge 6 in side view facing main clearance surface 6b
O axis of tool main body 11
T tool rotation direction
α inclination angle formed by auxiliary cutting edge 7 with respect to plane P in side view facing auxiliary clearance surface 7b β intersection angle formed by boundary line M with respect to main cutting edge 6 in plan view seen from direction facing hexagonal surface 2
θ rake angle of main rake surface 6a in rake angle gradual increase region 6e

What is claimed is:
1. A cutting insert comprising:
a polygonal plate-shaped insert main body that includes first and second polygonal surfaces facing opposite to each other and a plurality of side surfaces which are disposed in a vicinity of the first and second polygonal surfaces,
wherein a corner edge that has a corner rake surface on the first polygonal surface exists at a first corner portion among corner portions of the first polygonal surface of the insert main body,
from the corner edge to a second corner portion adjacent to the first corner portion in a circumferential direction of the first polygonal surface, a main cutting edge that has, on the first polygonal surface, a main rake surface connected to the corner rake surface and extends from a first end portion of the corner edge, and
the main cutting edge includes, at least on a corner edge side, a rake angle gradual increase region where a rake angle of the main rake surface gradually increases as going from the first end portion of the corner edge toward a second corner portion side,
wherein the rake angle gradual increase region is within a range of 1.0 mm to 2.0 mm from the first end portion of the corner edge in plan view facing the first polygonal surface, and the rake angle of the main cutting edge is constant within a range exceeding the first end portion of the corner edge by 2.0 mm.
2. The cutting insert according to claim 1,
wherein the rake angle in the rake angle gradual increase region increases 5° or more.
3. The cutting insert according to claim 1,
wherein a boundary line between the main rake surface and the corner rake surface, which extends from the first end portion of the corner edge toward an inner side of the first polygonal surface, intersects the main cutting edge at an intersection angle within a range of 20° to 60° in plan view facing the first polygonal surface.
4. The cutting insert according to claim 1,
wherein the corner edge extends in a protruding direction separating away from the second polygonal surface as going toward the first end portion.
5. The cutting insert according to claim 4,
wherein the corner edge is formed in a concave curve shape in side view facing a corner clearance surface, which intersects the corner rake surface via the corner edge, among the plurality of side surfaces of the insert main body.
6. The cutting insert according to claim 4,
wherein the first end portion of the corner edge protrudes with respect to a second end portion of the corner edge on an opposite side to the first end portion by a protruding amount within a range of 0.05 mm to 0.15 mm in side view facing a corner clearance surface, which intersects the corner rake surface via the corner edge, among the plurality of side surfaces of the insert main body.
7. The cutting insert according to claim 1,
wherein the insert main body has an insert center line passing through centers of the first and second polygonal surfaces, an auxiliary cutting edge is formed on the first polygonal surface to extend from a second end portion of the corner edge on an opposite side to the first end portion of the corner edge, and the auxiliary cutting edge has an auxiliary rake surface connected to the corner rake surface on an opposite side to the main rake surface, and the auxiliary cutting edge extends along a plane perpendicular to the insert center line or toward the second polygonal surface as going away from the second end portion of the corner edge, when viewed toward an auxiliary clearance surface that intersects the auxiliary rake surface via the auxiliary cutting edge.

8. The cutting insert according to claim 7,
wherein an inclination angle of the auxiliary cutting edge with respect to the plane perpendicular to the insert center line in the side view facing the auxiliary clearance surface is within a range of 0° to 15°.

9. The cutting insert according to claim 1,
wherein on the corner edge side, the main cutting edge goes away from the second polygonal surface while forming a convex curve and then extends toward the second polygonal surface as going from the first end portion of the corner edge toward the second corner portion side in side view facing a main clearance surface, which intersects the main rake surface, among the plurality of side surfaces.

10. The cutting insert according to claim 9,
wherein in the side view facing the main clearance surface, a curvature radius of the convex curve formed by the main cutting edge is within a range of 3 mm to 10 mm, and the main cutting edge forms the convex curve at least within a range of 1.0 mm from the first end portion of the corner edge.

11. The cutting insert according to claim 1,
wherein the insert main body is formed in a hexagonal plate shape that is a rotationally symmetric shape by every 120° about an insert center line passing through centers of the first and second polygonal surfaces and is a front-back inverted symmetric shape with respect to the first and second polygonal surfaces, and on the first and second polygonal surfaces, three first corner portions and three second corner portions are alternately disposed in a circumferential direction, and are disposed opposite to each other in a direction parallel to the insert center line.

12. The cutting insert according to claim 11,
wherein the plurality of side surfaces of the insert main body extend parallel to the insert center line.

13. A cutting edge replacement type cutting tool comprising the cutting insert according to claim 1 which is detachably attached to an insert attachment seat formed on a tip portion outer periphery of a tool main body having a rotation axis.

* * * * *